(12) United States Patent
Sawatzky et al.

(10) Patent No.: US 6,294,755 B1
(45) Date of Patent: Sep. 25, 2001

(54) GANTRY-MOUNTED LASER NOZZLE AND METHOD FOR CONTROLLING LASER POSITIONING

(75) Inventors: Brian D Sawatzky; Randall G. Andrews; Chris Want, all of Edmonton (CA)

(73) Assignee: Lacent Technologies, Inc., Alberta (CA)

(*) Notice: Subject to any disclaimer, the term of this patent is extended or adjusted under 35 U.S.C. 154(b) by 0 days.

(21) Appl. No.: 09/203,590

(22) Filed: Dec. 2, 1998

Related U.S. Application Data

(60) Provisional application No. 60/067,366, filed on Dec. 2, 1997.

(51) Int. Cl.[7] .................................................. G05B 19/04
(52) U.S. Cl. .................... 219/121.72; 83/940; 83/76.1
(58) Field of Search .......................... 219/121.67, 121.72, 219/121.79, 121.82; 173/1; 83/936–941, 32, 40, 55, 72, 74, 76, 76.3, 76.6, 76.7

(56) References Cited

U.S. PATENT DOCUMENTS

| | | | |
|---|---|---|---|
| 3,761,675 | 9/1973 | Mason et al. | 219/121 |
| 4,973,819 | 11/1990 | Thatcher | 219/121.78 |
| 5,237,151 | 8/1993 | Maruyama | 219/121.78 |
| 5,262,612 | 11/1993 | Momany et al. | 219/121.67 |
| 5,314,397 | 5/1994 | Mills et al. | 483/30 |
| 5,402,691 | 4/1995 | Dworkowski et al. | 74/490.09 |
| 5,481,083 | 1/1996 | Smyth, Jr. | 219/121.67 |
| 5,508,596 | * 4/1996 | Olsen | 318/569 |
| 5,550,346 | 8/1996 | Andriash et al. | 219/121.72 |
| 5,560,843 | 10/1996 | Koike et al. | 219/121.48 |
| 5,635,086 | 6/1997 | Warren, Jr. et al. | 219/121.39 |
| 5,854,544 | * 12/1998 | Speth et al. | 318/270 |
| 5,892,345 | * 4/1999 | Olsen | 318/571 |

FOREIGN PATENT DOCUMENTS

| | | |
|---|---|---|
| 2016554 | 11/1991 | (CA) . |
| 0 708 700 | 5/1996 | (EP) . |

* cited by examiner

*Primary Examiner*—Samuel M. Heinrich
(74) *Attorney, Agent, or Firm*—Millen, White, Zelano & Branigan, P.C.

(57) ABSTRACT

Method and positioner apparatus are provided for minimizing the time required to move a tool along a continuous path such as over material conveyed continuously thereunder. The continuous path is discretized into geometric moves, pairs of which are preferably joined to minimize positioner stop and go. Ranges of velocities are analyzed for each discrete move and are adjusted to overlap for fitting a continuous velocity curve therethrough. Optimizing of the velocity ranges for maximum tool acceleration and velocity results in a time-optimized velocity profile for the tool. Velocity profiles for each discrete move are further optimized to maximize acceleration and deceleration resulting in the most time spent at maximum velocity. Throughout, the method is cognizant of the effects of time and displacement being measured in integer increments. Rounding is appropriately performed and move parameters are adjusted appropriately. Apparatus capable of responding to such optimized control comprises parallel X-rails and a gantry, each end of the gantry being independently driven. Bearings permit the gantry to pivot, resulting translation being accepted by another bearing at one of the ends. Optical encoders on each X-rail and the gantry provide precision positional feedback.

13 Claims, 23 Drawing Sheets

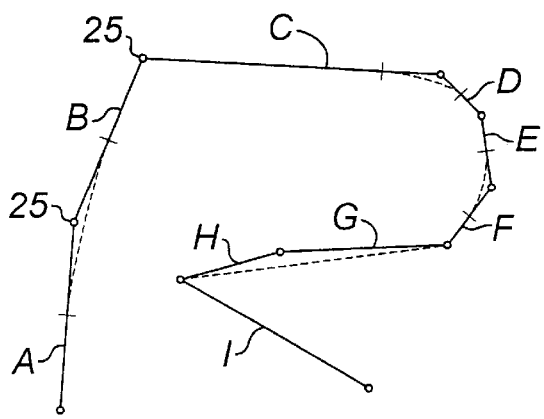
FIG. 7A
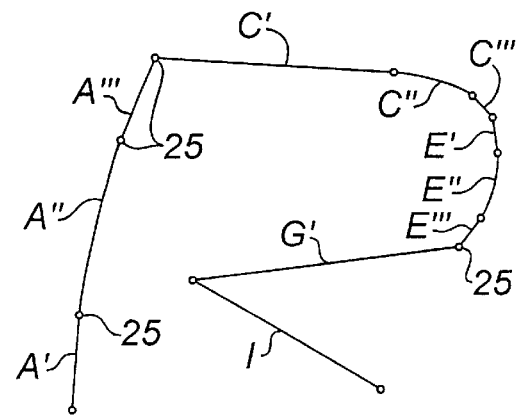
FIG. 7B
| MOVE i | X | Y | L | R | $X_C$ | $Y_C$ | $O_{ST}$ | $O_{END}$ |
|---|---|---|---|---|---|---|---|---|
| 0 | | | | | | | | |
| 1 | | | | | | | | |
| 2 | | | | | | | | |
| 3 | | | | | | | | |
| i | | | | | | | | |
| ⋮ | | | | | | | | |
| n | | | | | | | | |
FIG. 8

GANTRY-MOUNTED LASER NOZZLE AND METHOD FOR CONTROLLING LASER POSITIONING

This application claims the benefit of the filing date of U.S. Provisional Application Ser. No. 60/067,366, filed Dec. 2, 1997.

FIELD OF THE INVENTION

The invention relates to apparatus and method for controlling Cartesian positioning of a laser nozzle for cutting patterns out of flat stock. In particular, apparatus comprises X-Y positioner in an H configuration which uses linear motors to drive the gantry, and includes optimization methods such as joining and filleting sequential connected move vectors. Accommodation is made for real world constraints including time and distance being measured in discrete integer increments.

BACKGROUND OF THE INVENTION

A known method of laser cutting patterns in material is to advance a finite length of material into a cutting zone, and while the material is stationary, using a laser beam nozzle mounted to a X-Y positioner for emitting a laser beam to cut the pattern from the material.

The numerically controlled positioner positions the laser beam over the material in response to a predetermined known pattern. Once the pattern is cut the conveyor advances to eject the cut pattern and bring new material into the cutting zone.

Increases in throughput have been achieved by implementing multi-ply cutting, increasing the speed at which the laser moves and using rapid conveyor movement to eject material.

In Canadian Patent Application published in Canada as application number 2,016,554 in Nov. 11, 1991, a method is disclosed which partially achieves the objective of increasing the throughput of cut patterns by enabling laser cutting while material is moving in a continuous manner through the positioner laser cutting zone. This "Cut-on-the-Fly method provides two-fold savings: it eliminates the loading and unloading of material from the cutting zone; and it takes advantage of movement of the cutting head along the axis of the conveyor as well as across the conveyor. The conveyor and the fabric is passed through a rectangular (X&Y axes) cutting zone of finite dimensions. A laser nozzle is suspended from an X-Y positioner. The heavier laser itself is located remote from the positioner. The positioner is movable in X and Y axes for manipulating the laser nozzle and emitted laser beam within the cutting zone. A computer directs the positioning of the laser nozzle, its velocity and its acceleration. The laser nozzle is required to stop at each non-tangent intersection of discrete moves. The nozzle cannot accelerate through a curve.

The fabric is cut according to patterns specified in a data file. The conveyor moves through the cutting zone continuously, The laser beam must cut the pattern before the fabric leaves the cutting zone. The speed at which cut fabric may be produced is dependent upon factors including laser power, the physical speed at which laser nozzle can be manipulated through the cutting zone and optimization of the sequence of the cuts made so as to minimize wasted (non-cutting) movement and to ensure continuous movement of the conveyor. Accuracy of the cut, and hence the accuracy of the geometry of the pattern, is dependent upon the physical resolution of the positioner and the nature of the instructions given to the positioner.

The positioner used with the Cut-on-the-Fly apparatus described above employs a gantry which manipulates and positions the laser nozzle. Stepper motors are used to incrementally move the gantry along the X-axis and a stepper motor drives the laser nozzle along the Y axis. One stepper motor is used for X-axis control and is located on one end of the gantry.

Several issues arise when using stepper motors in moving a laser nozzle. First, the stepper motors do not provide the high resolution need for precise control, particularly at high speeds. Stepper motors are relative positioning devices, i.e. increment three steps from this position. As a result, the controller will still be feeding absolute coordinates to the positioner, but the stepper could have inherited an offset and are subject to slipping at high speed. The steppers become less effective as the demand for greater speed increases. The force produced by stepper motors is maximal at rest and falls off as the stepper speed increases. With the demand for greater and greater speeds, a stepper motor is pressed into service at its worse operating range, where little force is available to effect rapid changes in velocity. Further, if the laser nozzle is at the opposing end of the gantry from the stepper motor, then mechanical lag can result when driving the laser nozzle along the X-axis.

Accordingly, it is known in the prior art to provide:

An X-Y axes positioner upon which the lens and mirrors of a laser are suspended for issuing a laser beam to cut underlying material;

incremental or continuous conveyor movement for passing material beneath a laser cutting means;

user of stepper motors to control gantry movement;

use of a geometry set from which the pattern is determined, cut lines are calculated and optimization of the cutting sequence is performed; and use of a computer program to direct the laser position and coordinate laser position and continuous conveyor movement.

Challenges associated with cutting continuously moving materials include: p1 a. directing the positioner to cut along all of the cut lines on the material before the material moves out of the cut zone;

b. avoiding starting and stopping the laser nozzle movement, associated with lost time to decelerate and accelerate the nozzle;

c. avoiding high velocity during repositioning of the laser nozzle which can exceed the limited power laser's ability to cut the material, resulting in missed threads or uncut zones.

In is known to perform certain optimization by:

a. minimizing the time for "dry haul", that is, where the laser beam is not actively cutting but is merely being re-positioned;

b. planning to cut lines to cut the perimeter of the space between the patterns as opposed to the greater traversed distances for cutting the perimeter of the pattern itself; and c. predetermining the optimal cutting sequence.

In order to increase the throughput of the system the positioner movement can be further optimized by both minimizing stop and go, enabling acceleration through a curve, avoiding exceeding maximum velocities and accelerations, and by modification of the positioner to enable high acceleration while maintaining accurate positioning.

SUMMARY OF THE INVENTION

Minimizing positioner stop and go, minimizing time to move the tool through a path, and maximizing acceleration requires improved control of the positioner and improved positioner apparatus.

Improved positioner apparatus is achieved by providing:
improved positioner structure; and
improved positioner feedback.
Improved control of the positioner is provided by:
modifying the tool path to minimize stop and go;
modifying the tool velocity profile throughout the path to minimize time while adhering to limitations including maximum tool acceleration, velocity and being cognizant of integer values for position and time; and
controlling conveyor movement to ensure continuous movement and continuous velocity across bites.

The improved system integrates improved optimization of positioner control, elimination of conveyor stoppage and an improved positioner apparatus which provides increased resolution, accuracy, and acceleration. All of the above contribute and result in increased material throughput which can be in the order of 15 to 20% faster than prior art apparatus and processes.

While the invention was developed in the context of cutting fabric with a laser, any tool which must be moved quickly along a continuous path will be beneficially affected by the improved throughput of apparatus fitted with the improvements.

Simply put, positioner apparatus is improved to provide increased acceleration response and increased precision for complementing optimization routines disclosed herein. Improved response is achieved in part by providing a gantry with independent drives and pivotal ends. Linear servo motors independently drive each of the two ends of the gantry and the tool (laser nozzle) along the gantry. The gantry structure is optimized to be lightweight, yet continue to retain rigidity.

Also stated simply, an improved process is provided which comprises optimization and cutting look-ahead steps which minimize laser nozzle stop and go through a continuous cut, optimize the velocity profile of discrete moves, and maximize the capabilities of the positioner apparatus. In doing so, the positioner and process steps are cognizant of constraints such as:

1. the inertial limitations of the positioner;
2. the maximal velocity of the tool—in the laser and fabric context, being constrained by the relationship of laser power and the ease in which fabric can be cut;
3. the incremental integer movement resolution of the X-Y positioner; and
4. the incremental integer time resolution of the digital controller for processing positioning control signals for directing the X-Y positioner.

The velocity profile for the laser nozzle itself is optimized to maximize its acceleration, achieving maximal velocity as soon as possible, preferably achieving a maximal velocity, and then maximizing deceleration so as to prolong the highest velocity portions of the profile.

In a broad method aspect of the invention then a method of minimizing the time taken to move a tool along a continuous geometric path is provided, the tool being movable on a gantry along the Y axis and the gantry being movable along the X axis, comprising the steps of discretizing the path to a plurality of discrete geometric moves and establishing the minimum desired time to move the tool through each move given maximum tool velocity and maximum tool acceleration. Then for each move, one determines the tool acceleration and velocity so as to establish a range of maximum and minimum velocities for each move. Preferably, time and displacement are rounded to the next higher integer values which are apparatus dependent.

If the range of maximum and minimum velocities does not overlap the previous or subsequent velocity ranges then the minimum time is increased and new lower ranges of velocities are established for that move. The maximum and minimum start and end velocities are adjusted to match with adjacent velocity ranges and finally, a velocity curve is fit through each velocity range so as to define the tool movement parameters for minimizing the time for traversing the path.

Preferably, prior to establishing a velocity profile, discrete moves are optimize to minimize stop and go (at non-tangential intersections), by joining near parallel adjacent moves and filleting across more highly deviated adjacent moves.

More preferably, after establishing a velocity profile for a continuous path, individual moves are further optimized, if possible, by dividing a move into an acceleration, constant velocity and deceleration sub-moves. Sub-moves are created which are a result of maximal acceleration and velocity and integer time constraints, and new sub-move geometry is compliant with integer displacement.

Improved apparatus is provided which is capable of moving a tool along a path at high speeds. More particularly, and in a broad aspect, apparatus comprises a pair of parallel X-rails and a perpendicular Y gantry. A tool is movable along the Y gantry. The Y gantry is connected adjacent its ends by pivot bearings. A translation bearing at one end of the Y gantry permits longitudinal movement thereof. Each end of the Y gantry is independently driven, preferably by linear servo motors. The tool is driven along the Y gantry, preferably by a linear servo motor or belt drive. Position feedback if provided for each of the ends of the Y gantry along the X-rails and of the tool along the Y gantry. A controller is provided to read the positional feedback and drive the tool to the X and Y coordinates specified.

BRIEF DESCRIPTION OF THE DRAWINGS

FIGS. 7a and 7b illustrate and example demonstrating the result of the Join and Look optimization processes;

FIG. 8 is a diagrammatic representation of the resulting data array of geometrically optimized moves;

FIG. 10a illustrates an intermediate linear move. FIG. 10b illustrates time based on maximum acceleration. FIG. 10c illustrates time based on a $3^{rd}$ order equation because the previous fit resulted in velocities greater than $V_{max}$;

FIG. 15b illustrates the resultant matched velocity ranges for the six adjacent moves of FIG. 15a;

DETAILED DESCRIPTION OF THE PREFERRED EMBODIMENT

As stated above, increased throughput is achieved through optimization of the movement of a tool which can involve high velocity and accelerations and, accordingly, the X-Y positioner for the tool must be capable of high acceleration and precise movements.

While the invention is described in the context of moving a laser beam over a pattern in cloth material, it is understood that the concept is applicable equally to moving a tool over a pattern in other applications, such as a laser beam over a steel plate, or a milling tool over soft sheet materials.

Figure 1:
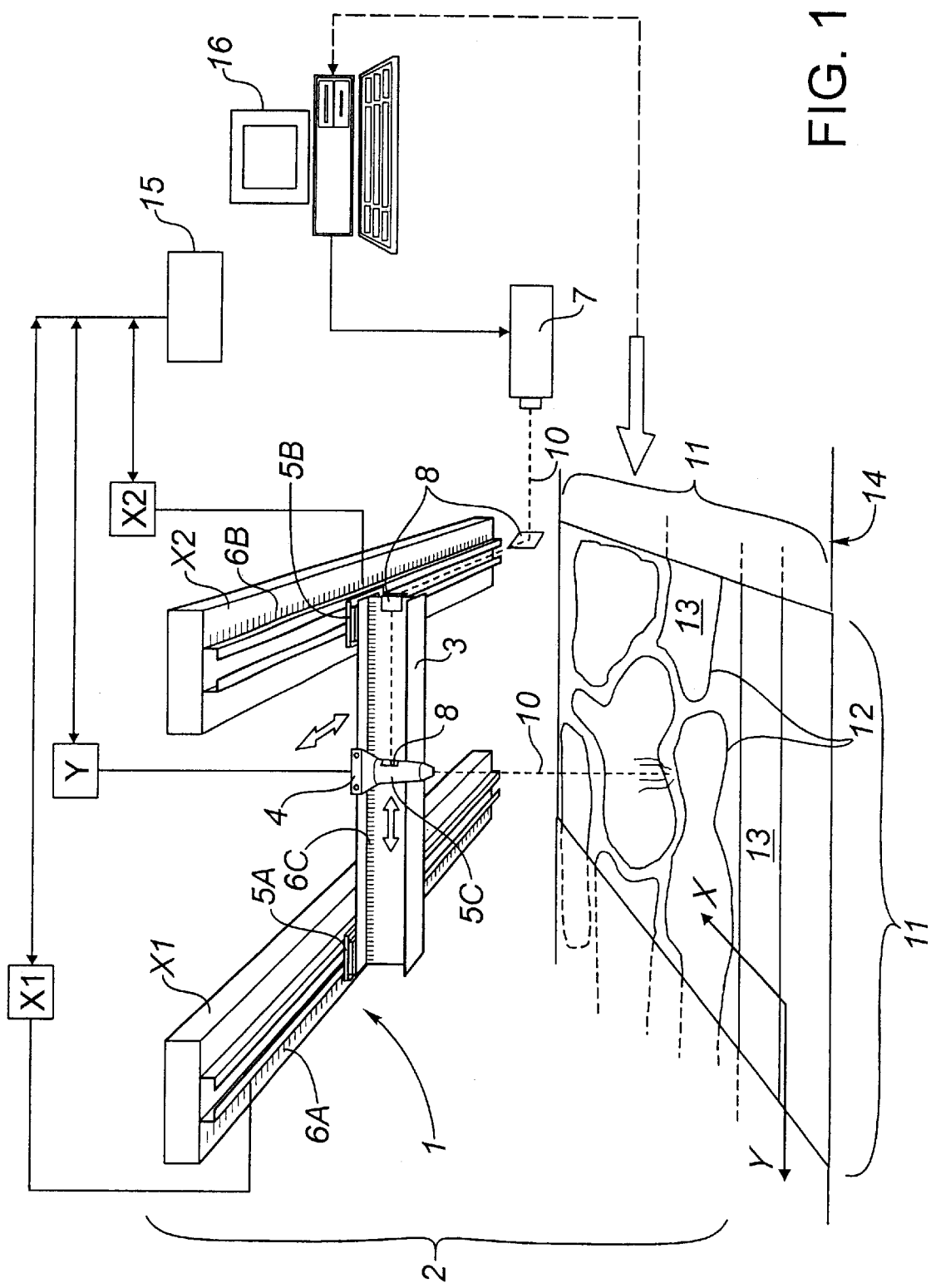
FIG. 1 is a partial exaggerated perspective view of the inside of the laser cutting apparatus based upon one embodiment of the invention. The view depicts a cutting zone underlying a simplified X-Y positioner and illustrates a basic schematic of the key control elements. Details of the positioner are provided in FIGS. 21–25.

Having reference to FIG. 1, an X-Y positioner 1 of a laser cutting apparatus 2 is shown comprising an X1 rail, and X2 rail (the X-rails X1, X2) and a Y gantry 3. The Y gantry is movable through the X-axis along the X-rails. A tool or laser nozzle 4 is movable through the Y-axis along Y gantry 3. Accordingly, the laser nozzle is movable in X-Y Cartesian coordinates.

Linear servo motors 5a, 5b are mounted at each end X1, X2 of the Y gantry 3 respectively and at the laser nozzle 5c.

Linear encoders 6a, 6b, 6c are located along the X-rails X1, X2 and Y gantry 3 respectively for providing feedback on the Y gantry 3 and nozzle 4 positions in absolute coordinates.

A laser 7 and mirrors 8 conduct coherent light to the laser nozzle 4 to form a laser beam 10. The X-Y positioner 1 is located over the cut zone 11 of the cutting apparatus. The laser beam 10 is focussed on the material 13 in the cut zone 11 and is shown making a cut in a pattern 12. The material 13 overlies an endless conveyor 14 which is speed controllable and movable along the Y axis.

More particularly, material 13 is moved continuously through the laser cutting apparatus 2. The material 13 movement is longitudinal with the conveyor 14. The material 13 has a width which fits fully within the apparatus 2. The laser nozzle 4 has a range of movement fully across the width (X-axis) of the material 13 but only limited movement longitudinally (Y-axis). The range of nozzle 4 movement is deemed to be the cut zone 11.

The parts of a pattern 12 have generally already been pre-fitted into what is called a nest (not shown). A nest is a repeatable pattern 12 of parts laid out in a collection or grouping so as to minimize material 13 waste. A bite length or width is determined which is machine dependent and is generally less than the length of a nest. It is necessary to calculate a bite because the longitudinal length of a pattern 12 or nest is not likely to fit within the cut zone 11 of the apparatus 2. A bite is approximately ½ the length of the longitudinal cut zone 11. For example a 44 in. cut zone may only provide a 22 in. bite.

A digital motion controller 15 and computer 16 process the X1, X2 and Y gantry encoders 6a, 6b, 6c and conveyor 14 movement information. The computer 16 processes the pattern 12 information and outputs optimized cut moves.

The motion controller outputs commands to drive the linear motors 5a, 5b, 5c and conveyor 14 drive to coordinate the motion of laser nozzle 4 on the X-Y positioner 1 and the speed of the conveyor 14.

Figure 2:
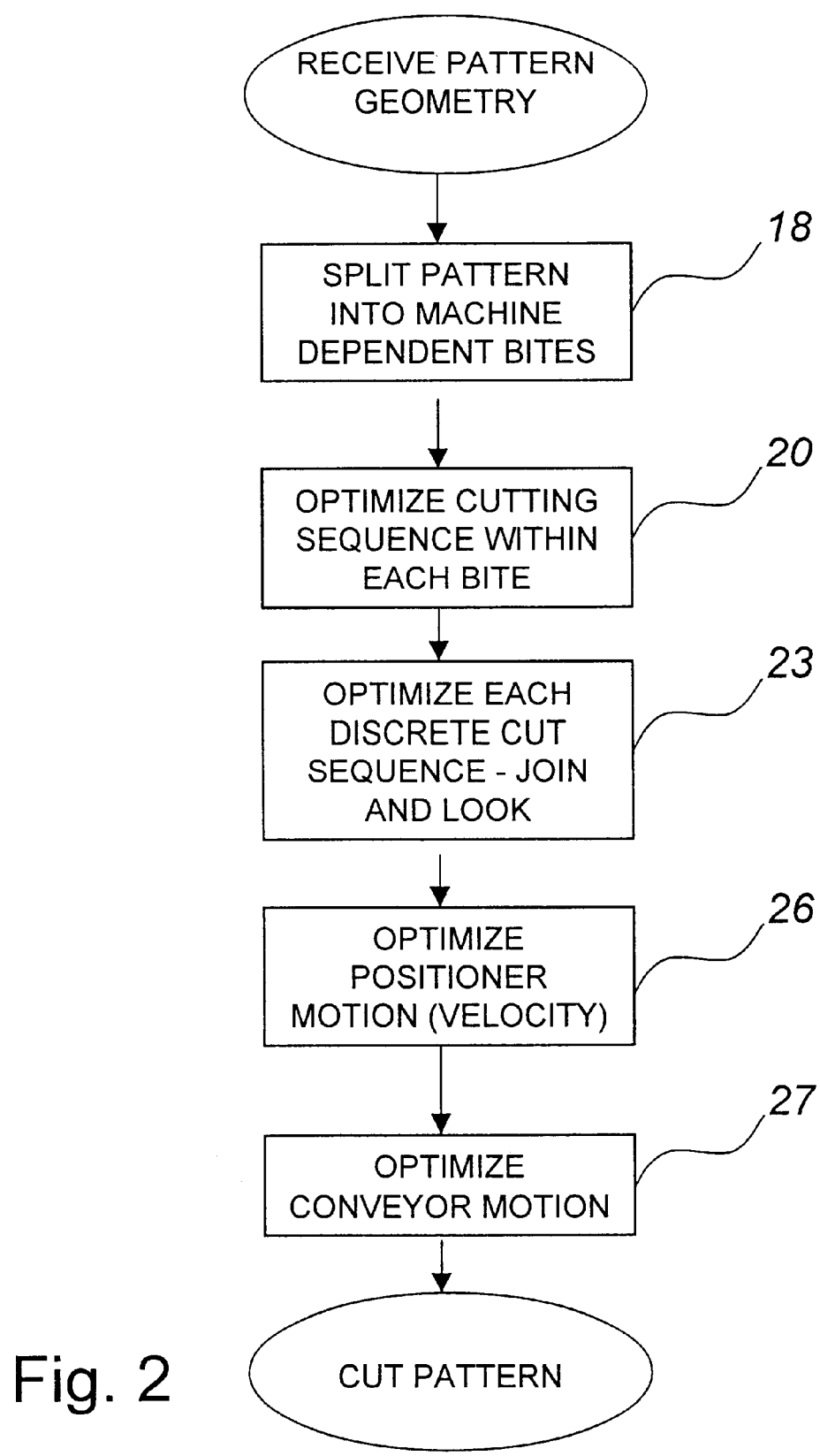
FIG. 2 is a flow chart depicting the overall optimization process of the invention.

A process is described which takes geometry and optimizes the movement of the laser nozzle over the material. In overview, and referring to the flow chart of FIG. 2, after the geometry of a pattern 12 is received:

(a) at block 18, the geometry is organized into machine dependent bites which fit within the cutting zone 11;

(b) at block 20, the cutting sequence across width of the bite is optimized.

As a result, geometry is established as a series of continuous cuts 21 separated by dry hauls 22;

(c) at block 23, the geometry of the continuous cuts is optimized into a plurality of discrete moves 24 by minimizing the number of non-tangent intersections 25 forming new moves 24, and thus minimizing inefficient stop and go actions within the continuous cut 21;

(d) at block 26, the positioner motion profile is determined by optimizing the velocity profile of each discrete move 24, all the while being cognizant of system constraints. Moves 24 are also referred to herein as vectors. Curved moves are also referred to generically as moves 24 or as curves 30; and finally (e) at block 27, the conveyor 14 motion is optimized for maintaining piecewise continuous, forward velocity, even between bites and velocity is not permitted to become negative.

The resulting geometry is stored and the optimized moves 24 are sent through the motion controller 15 for driving the positioner 1 for cutting the pattern 12.

With respect to optimization, by looking ahead to the next move 24, one can optimize the laser nozzle 4 movement. The objective of this "Look ahead" process is to minimize the time that is required to follow any arbitrary geometry or pattern 12 while avoiding exceeding specified maximum acceleration's and velocities or drifting outside dimensional tolerances.

Practical constraints such as discrete time and displacement result in measured and outputted values which are either too big or too small when compared to the calculated theoretical real number values. For example, a particular cut actually require 1.5 ms to traverse, yet the controller may only measure to the nearest 1 or 2 ms. This actual required time applied to this coarse resolution then represents a 50% error in time and using $3^{rd}$ order equations $t^3$, the calculated acceleration could be orders of magnitude times too great. The pattern or subsequent calculated coordinates may dictate real number values which are intermediate the actual integer step movements possible with the apparatus.

The motion control processor cannot accept instructions at a rate faster than it can process them. In other words, one cannot instruct the laser nozzle 4 to move more often than the controller 15 can accept the move data. This defines a system minimum time $t_{min}$ and it is motion controller board dependent. If move instructions are fed to the controller faster than $t_{min}$, rather than perform an incorrect move, a watchdog timer in the controller 15 will shut the whole process off. For older digital controllers 15, the minimum time necessary to process and output Position, Velocity and Time (PVT) signals to the positioner for a move may be in the order of 0.025 seconds or 25 milliseconds. Accordingly, should the actual time needed to travel the required distance be 25.5 milliseconds, the resulting error is not so significant. Now, however with newer digital controller cards providing PVT response time in the order of 5 or less milliseconds and coupled with a desire to provide smaller incremental lengths for the cuts, a 0.5 millisecond variation is very significant. Conventional algorithms accumulate successive moves until the minimum time of 25 milliseconds is achieved and then the move is processed. Unfortunately, such an extended move is processed all at once regardless of violations of acceleration and velocity limits during an intermediate portion of that move.

For example a digital controller 15 which is successfully used is the PMAC2, available from Delta Tau Data Systems, Inc., Chatsworth, Calif., available as computer expansion card. The PMAC2 is a multi-axis motion controller. While capable of using cubic spline fitting through curved trajectories, the controller is also capable of accepting position, velocity time (PVT) instructions. PVT instructions permit a more accurate profile. The controller 15 must receive time as an integer or else the controller rounds it to the nearest integer.

The minimum system time $t_{min}$ is dependent upon factors such as: clock rate, the number of axis being controlled, axis update rate, number of programmable logic controllers (PLC's) are being run, how often the PLC is being updated, the complexity of the program (i.e. whether it must solve trigonometric functions). In an implementation of the preferred embodiment, minimum system move time of about 5 milliseconds is acceptable.

Maximum acceleration is substantially an inertial restriction, influenced by the structure or positioner 1 being moved. Maximum velocity is based on mechanical and electrical constraints, encoder feedback and power of the laser 7. Dependent upon the laser's power, if the laser nozzle 4 moves too fast it will not cleanly cut the material 13.

The geometry of the pattern is based initially upon a computer aided drawing file (such as would be output from a CAD program AutoCAD, available from Autodesk Inc., Cupertino, Calif.). The CAD file defines a series of geometric elements. These elements include polylines 21. In this application, polylines are identified as cuts along the pattern which are continuous.

In its simplest form, optimization on a micro scale involves optimizing the path of the laser nozzle 4 within the bite by determining its sequence. The sequence is simply a matter of minimizing dry haul 22 between discrete continuous cuts 21 within a bite such as, in an exaggerated example, avoiding cutting at the bottom of the width of the bite, then its top, and then back to the bottom again. Conventional algorithms are used to calculate the sequence. Further, on a macro scale, optimization involves preventing wasteful dry haul 22 which results if cutting of one bite is finished at the bottom of one bite and is started at the top of the next bite.

Figure 3A:
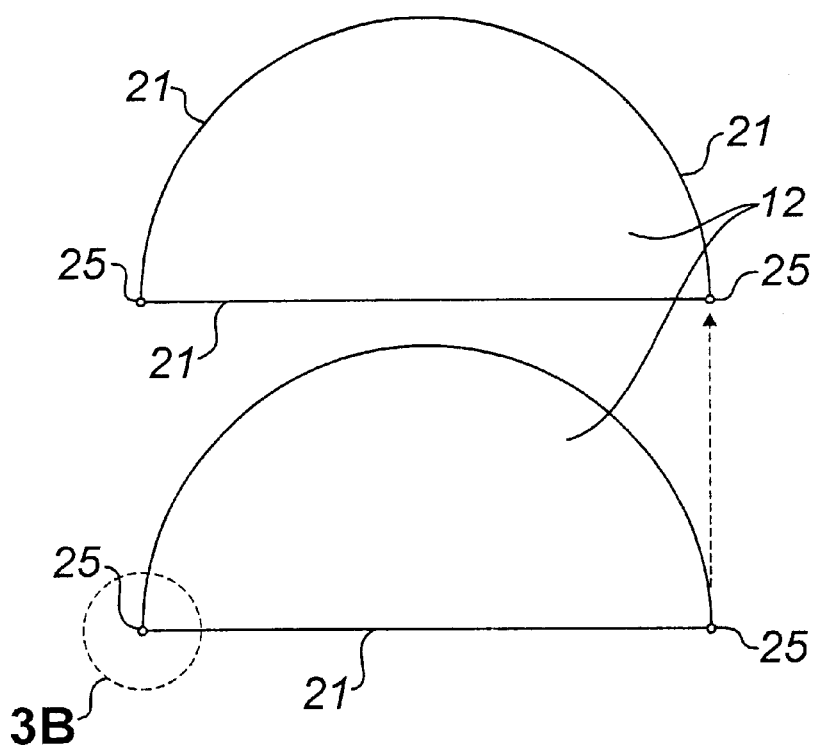
FIG. 3a illustrates two half-circle patterns each comprising a continuous linear line and a continuous curved line.
Figure 3B:
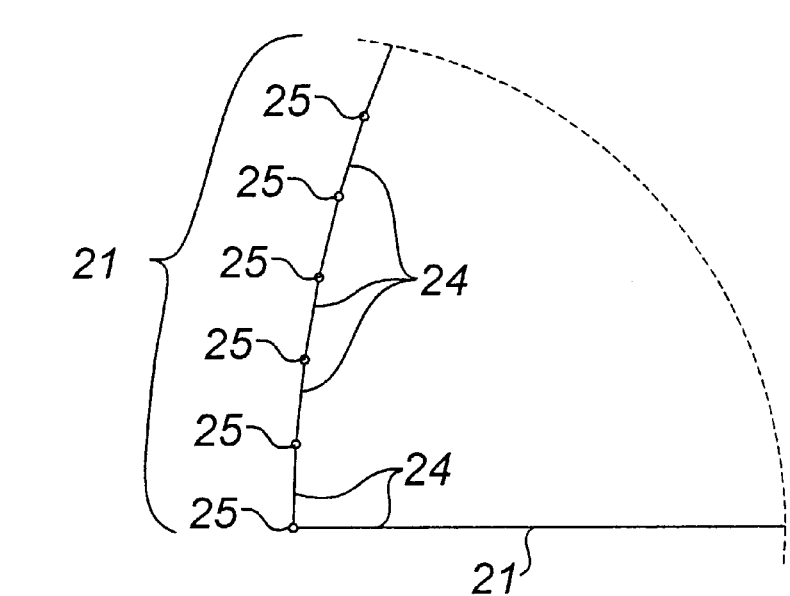
FIG. 3b illustrates an expanded view of one of the patterns of FIG. 3a, according to cut-out lllb, the continuous curved line now seen to comprise a plurality of linear moves.

As shown in FIG. 3b, polylines 21 are defined basically as being continuous cuts 21 separated by dry haul movements 22. Polylines 21 comprise a plurality of linear line segments, vectors or moves 24, followed by a dry haul movement 22. Each polyline 21 is characterized by a zero start velocity and a zero end velocity.

The time necessary to cut a specific set of polylines 21 can be minimized by increasing the laser nozzle's average velocity. This can be achieved by avoiding nozzle-arresting non-tangent intersections 25.

Optimization of geometry, per block 23, involves determining which vectors 24 qualify for either joining (Join) or for filleting (Look) vectors. Certain rules are applied to determine the geometry, including:

(a) that the length of a vector 24 must be defined by integer numbers due to the constraints of the digital controller 15;

(b) that an optimized vector 24c, defined by either joining vectors 24a, 24b or filleting with curves 30, will never deviate more than a given maximum amount 31 from the original linear vectors 24a, 24b; and (c) that the length for vectors 24, joined or filleted vectors 24c, and curves 30 are optimized, meaning the velocity of the nozzle 4 can be maximized for the move 24 while avoiding a vector traverse time which is unacceptably lower that than the minimum system time $t_{min}$.

Contrary to the apparent objectives, Look Ahead optimization introduces an error 31 into the pattern so as to improve cutting speed.

The LOOK AHEAD process would be easily solved except for real world constraints including:

movement of the positioner 1 is measured only in discrete, non-divisible incremental steps such as integer steps of 1/1000 of an inch;

the digital controller 15 measuring elapsed time for the positioner movement measures only in small but discrete and non-divisible time slices, such as integer steps of milliseconds;

the digital controller is only capable of processing data at a maximum rate;

If the above constraints are not considered, high acceleration rates of the positioner can result, beyond the capability of the positioner to react or cut the material 13 reliably and within tolerance, introducing error.

Further, a new optimized move cannot take the laser nozzle 4 outside the dimensional maximum tolerance 31 for the task. For instance, this is a value set as increments of 0.001 of an inch. Note that the capabilities of the positioner 1 affect this value. The positioner's ability to handle acceleration will affect the dimensional tolerance. For example, it is possible excessive acceleration or deceleration of the positioner 1 will result in bounce or oscillation which may be, or may not be, beyond the permitted tolerance 31.

Optimization Geometry

Figure 6:
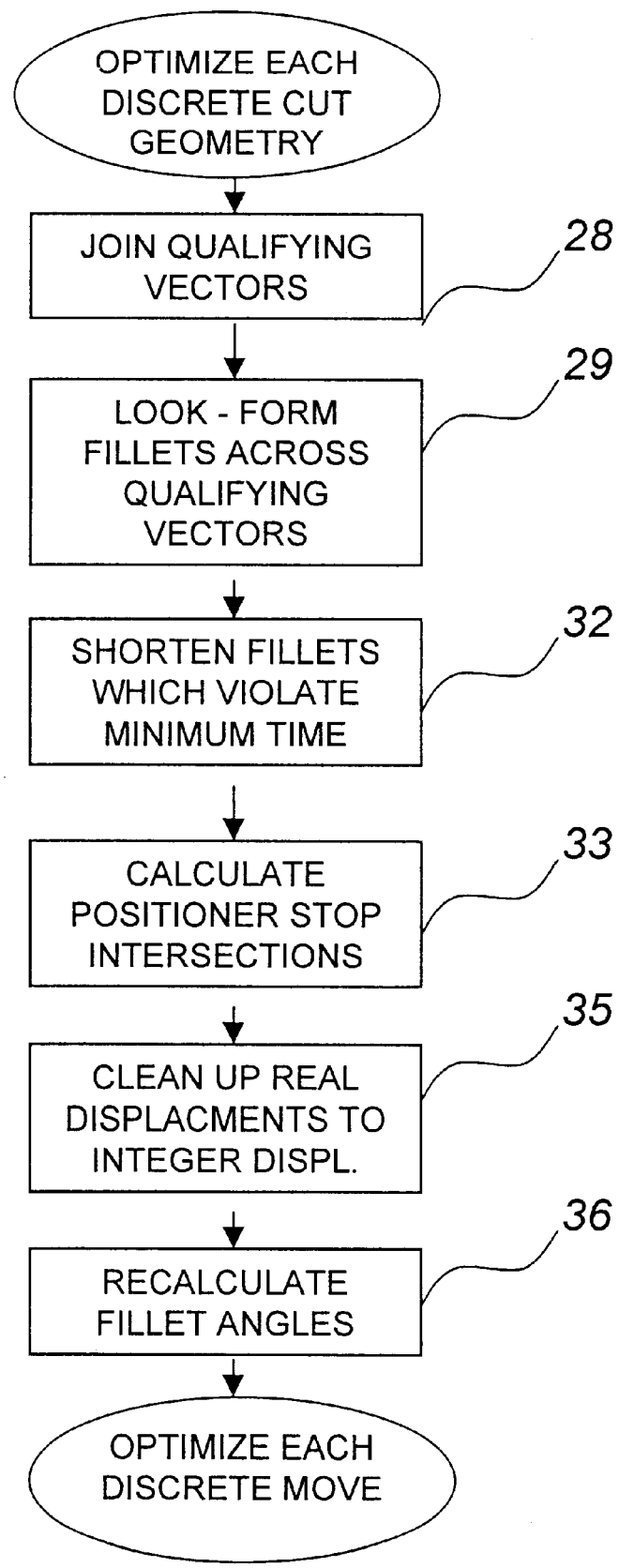
FIG. 6 is a flow chart depicting the joining process demonstrated in FIGS. 4 and 5.

Having reference to FIG. 6, the above objectives are accomplished by manipulating move vectors according to certain steps.

Figure 4:
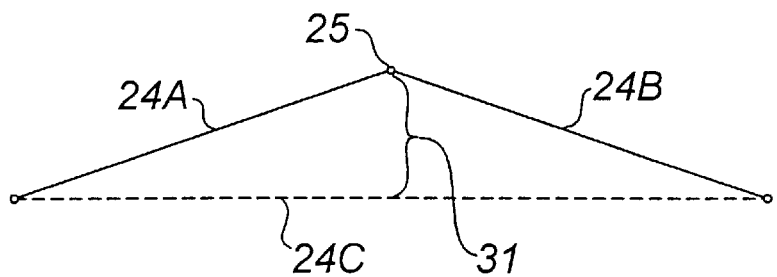
FIG. 4 shows two linear moves or vectors joined with a new vector.
Figure 5:
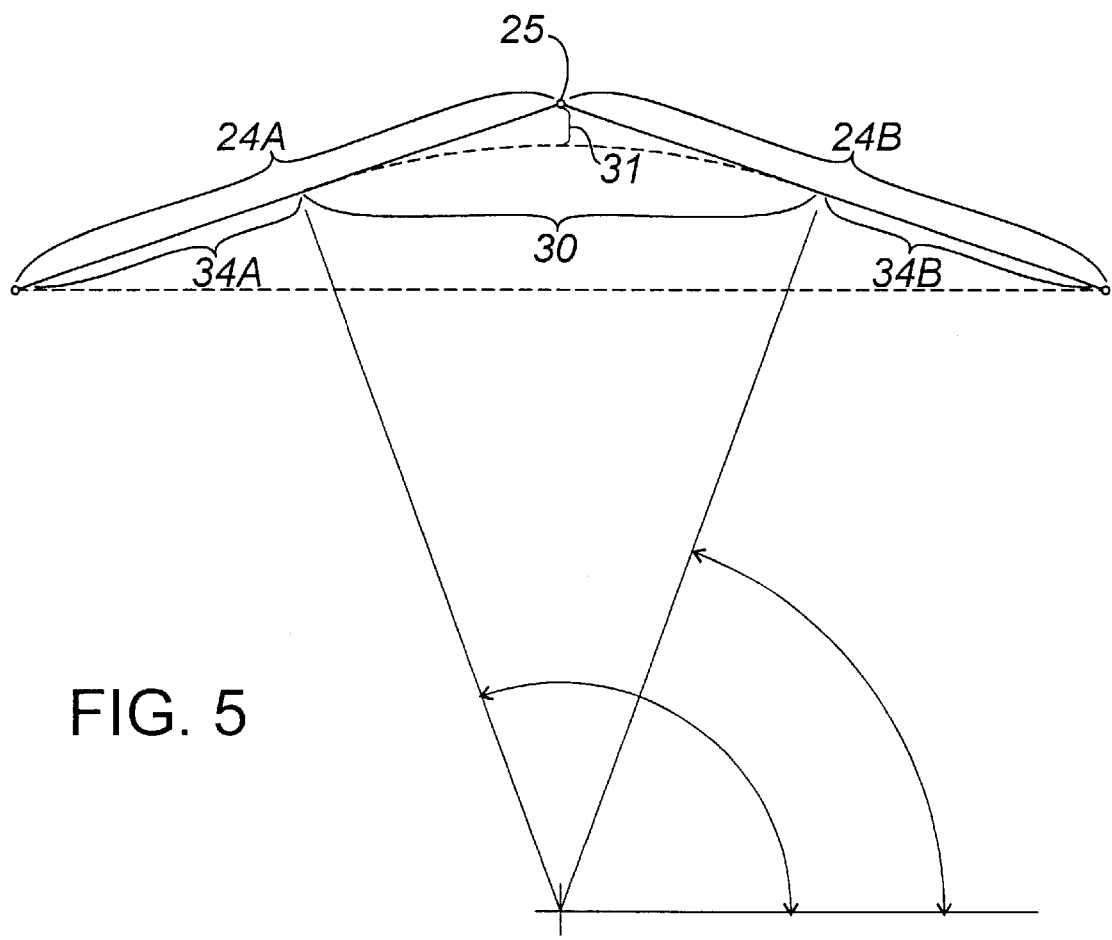
FIG. 5 shows two linear vectors joined by a fillet or curve.

Briefly, having reference to FIGS. 4 and 5, at any non-tangential intersection 25 of two vectors or moves 24a, 24b, the positioner 1 must temporarily stop in both the X and the Y axes. Joining of two nearly linear vectors 24a, 24b or addition of a curve move 30 tangent to both vectors 24a,25b prevents the need for this stop. The position and radius of a curve 30 is calculated and tested so as to ensure maximum dimensional error 31 is not exceeded.

More particularly, at block 28, vectors are joined. Having reference to FIG. 4, two adjoining vectors 24a,24b are nearly in a straight line. The two vectors can be joined together to form one new linear vector 24c by directly joining the start of the first vector 24a to the end of the second vector 24b. Whether this is permissible is determined by measuring the difference between the intersection 25 of the two vectors 24a,24b and a line perpendicular to the new vector 24c. If that difference is greater than the maximum tolerance 31 then you cannot join those two vectors. A danger exists in recursive looping of the analysis, particularly if, by subsequently converting two vectors to a new vector, the incremental error is always less than the allowable tolerance. Using that stepwise analysis, one could take all of the vectors forming circle and sequentially join them and create a single linear vector. This is obviously incorrect. Accordingly, the routine is arbitrarily limited to joining only two vectors 24a,24b in a row.

At block 29, if two vectors 24a,24b do not qualify to be joined, then one moves to the Look routine. More specifically, and having reference to FIG. 5, vectors are identified which qualify to have a fillet or curve 30 fitted thereto based upon the angle between the two vectors. If they qualify, the radius and length of the curve 30 is calculated. As a preliminary restriction, the length of curve is limited to ½ of the length of the shortest vector 24a or 24b. Basically, first one determines whether it makes sense to make a curve 30, the curve is calculated, and finally the length of the curve is adjusted to avoid a minimum system time $t_{min}$ restriction. If the angle phi between the vectors is less than 2.26 radians, or 129.4 degrees, then Look 29 fits the curve 30 across the intersection. The curve's coordinates x, y, the radius and curve length are determined. The curves' center is calculated. The two vectors are illustrated as being optimized as three new vectors 34a,30,34b. In a global coordinate system, the center and the radius of the curve 30 are determined as are the starting and ending angles, theta start and theta end.

At block 32, the error between the new curve and the two vectors is compared against the maximum tolerance. If the difference or error is less than the maximum tolerance 31 then the length of the curve 30 is checked. If the curve length is greater than one third of the sum of the lengths of the two vectors 24a,24b, then the curve length is restricted to one third the summed length. A new curve is calculated based on this one-third length criteria. The one-third length criteria is imposed to avoid having short vectors at the start and at the end of the three new vectors, those short lengths possibly resulting in move times less than $t_{min}$. If the move are too small then, in fact, the Look optimization may actually slow the cutting time down, because the positioner must be instructed to wait out $t_{min}$ before it can process the next move or vector.

Having reference to FIG. 7a 7b, nine vectors are depicted (A,B,C,D,E, F,G,H,I).

The first vectors A and B have too great an angle and length to qualify for the Join routine 28. The Look routine 29 is able to apply to a curve. Accordingly vectors A and B become a linear vector A', a curve A", and a linear vector A.

The vectors B and C, have too small an angle and qualify neither for Join 28 or Look 29. The intersection between vectors B and C will be a stop point.

Vectors C and D qualify for the Look routine 29 and form new vectors C', C" and C.

Vectors E and F qualify for the Look routine 29 and form new vectors E', E", and E. The angle between vectors E and G is too small for the Look routine 29. The intersection between vectors E and G will be a stop point.

Vectors G and H are sufficiently in lie that they qualify for the Join routine 28 and form new vector G'.

The angle between vectors G' and I is too small either for Join 28 or for Look 29. The intersection between vectors G' and I will be a stop point.

Note that while the nine vectors are now redefined as 11 vectors, ten (time consuming) stop points have been converted to only five stop points, with the associated saving in time.

Also note that a polyline 21 must have its start and ends points remain exactly as they were originally provided. In other words the absolute coordinates of the start and end points must remain the same, while the intermediate coordinates of each vector can vary according to the optimization routine used, either Join 28 or Look 29.

At block 33, each intersection of two vectors 24a,24b is reviewed and determines whether or not the intersection's starting angle is the same as its ending angle; if so, then those vectors are tangential at that point. If they are tangential, then the velocity is continuous, and the positioner does not have to stop. Otherwise, the point is called a stop.

At block 35, individual vectors 24 are rounded to the nearest distance increment. If a vector or move length is not an integer in 0.001 of an inch, then the residual error is accumulated. When the accumulated error exceeds ½ increments, it is added to the next move. If a move length is rounded to zero, then the move is deleted from the array.

After the clean routine 35, where the coordinates have been rounded, start and stop angles for all curves may have been altered. Based on the new coordinates, the new angles theta are recalculated.

The non-optimized vectors 24a and 24b and optimized new vectors 24c or 34a, 30 and 34b are placed into a data array (FIG. 8) for subsequent determination of the positioner and conveyor 14 motion profiles. The array data includes displacement change in X, a change in Y, the length of the move, radius of a curve (flagged for a linear line as zero), and the starting and ending angles through a curve in theta.

Basically geometry is calculated and optimized where possible to minimize stop and go.

Optimize Positioner Motion

The array of geometrically optimized moves, per FIG. 8, represents optimization for minimizing the numbers of starts and stops of the laser nozzle, but is not necessarily optimized for minimizing move time.

For minimizing move time, one creates a velocity profile for defining the acceleration and velocities of the tool throughout the move. Throughout, one must be cognizant of the constraints of time and displacement being measured in increments of integers. Appropriate rounding of time and displacement to integer time and displacement must be made before such errors are introduced.

Figure 9:
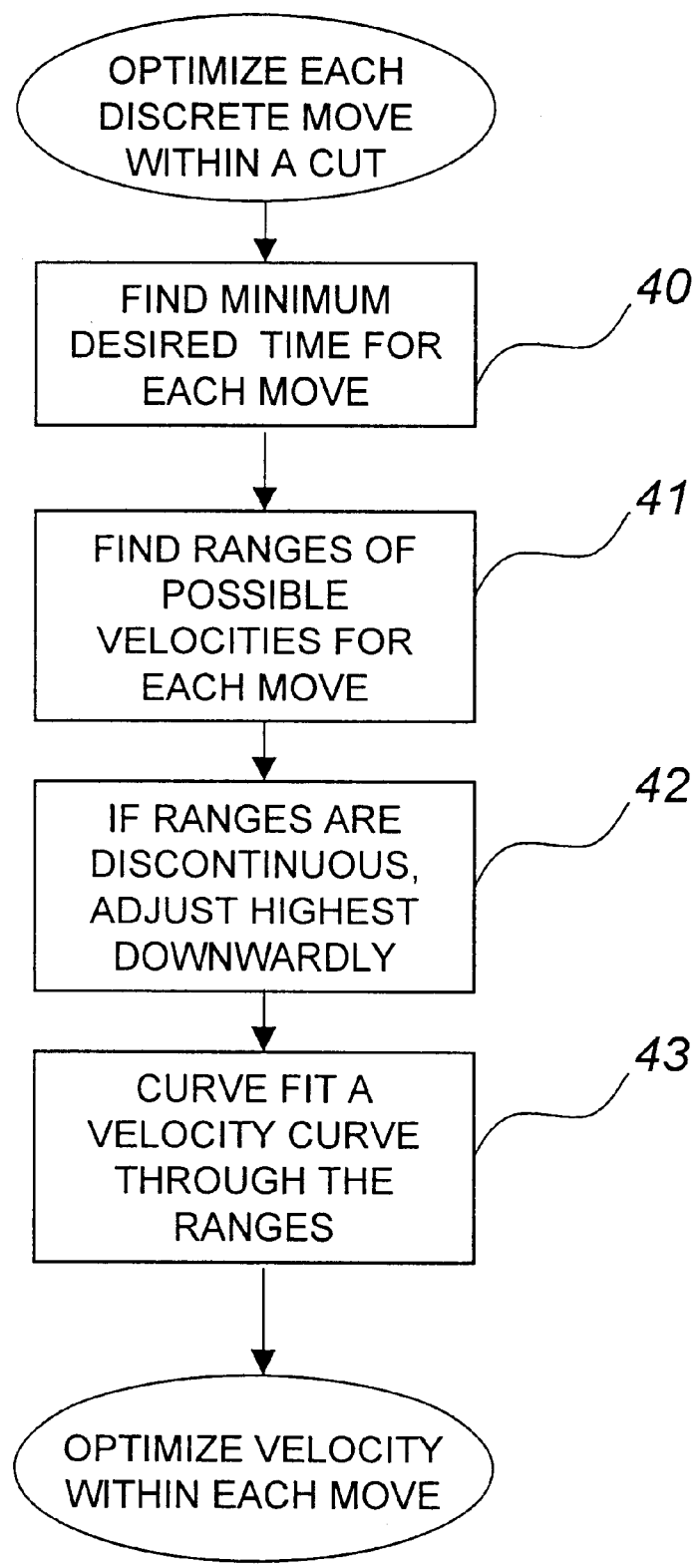
FIG. 9 is a flow chart depicting the position motion profile optimization.

Having reference to FIG. 9, a velocity curve is established for a polyline which maximizes velocity and is continuous.

More particularly:
(a) at block 40, a minimum desired time is first calculated for each discrete move that time being based on the fastest velocity and maximum accelerations possible;
(b) at block 41, ranges of velocity profiles are determined for each discrete move which are the maximum for that discrete move irrespective of adjacent connecting moves;
(c) at block 42, the ranges of velocities for discrete move's are considered with their adjacent moves. Velocity ranges which are too great to be continuous with the adjacent discrete moves have their time adjusted to complete the move increased thereby adjusting the ranges velocity downward; and once all discrete moves have velocities which overlap, then
(d) at block 43, a velocity profile which is continuous its be fit through all discrete move velocity profiles.

Throughout, the positioner 1 is controlled according to certain rules, including
(a) that velocities along the vectors or moves are piecewise continuous;
(b) the solution for velocities and accelerations do not exceed given system maximum's;
(c) when time is determined, it is deemed to be a integer greater than some minimum amount dependent upon the specific digital motion controller;
(d) all distances are measured as integers. This is a function of the resolution of the positioner encoders;
(e) the absolute velocity can change around a curve.
(f) that curves and vectors can be discretized to minimize the overall time; and
(g) each vector or curve is described by two-$3^{rd}$ order equations, an equation for the X equation and an equation for the Y direction.

The invention permits use of differing start and end velocities for curves in contradistinction to prior systems in which a laser nozzle 10 was moved at a constant velocity, decelerated and then moved a constant angular velocity through a curve. Deceleration and acceleration can now be performed throughout a move, or a curve as long as the angular acceleration is constant, aiding in reducing the time necessary to complete the task.

Since there can now be a range of start velocities and a range of end velocities, it is now possible and more flexible to find a solution for velocities at the start and end of each move, linear or curved.

The initial and final velocities can be determined and a velocity profile is formed for each polyline 21. The area under the profile for each polyline cut 21 represents the distance traversed. Characteristically, the higher the start velocity ($v_i$), the lower is the final velocity ($v_1$) necessary to traverse the given distance. Conversely, a high start velocity means that a lower final velocity will result. This provides a range of start and final velocities or solutions which meet the distance traveled requirements. As time, which is measured in milliseconds, is an integer, the number of solutions to the velocity curve is finite. The initial and exit move velocities must be matched with preceding and successive move velocities. If they do not, then an iterative re-calculation of all velocities is conducted.

In optimizing the move of a tool (the laser nozzle 4), the usual constraints of maximum acceleration and maximum velocity are expanded to include the need to measure time as multiple increments of integer time, and measure distance as multiple increments of integer distance. Yet another constraint is the minimum system move time $t_{min}$.

Move length is calculated as increments of encoder counts. Time to complete the move is calculated in increments of integer time. Time is often calculated as a function f velocity and acceleration. If the calculated value for time is a real number then it is rounded to integer time and velocity and accelerations are recalculated. With third order equations, errors in time resulting from real to integer conversion can result in vary large errors. If not accounted for Generally then, time is equal to a constant times the minimum size integer time increment and displacement or coordinates are equal to a constant times the minimum size integer displacement or encoder increment.

Basically, each move is associated with a time to perform that move. There are many different possible start and end velocities with an average velocity which describe the movement of that distance over time. The trick is to find the start and end velocities for each move which will interface (flow without a discontinuity) to each other preceding or subsequent bordering move without violating either the given the acceleration maximum or a given velocity maximum.

Minimum Desired Time t*

Figure 10A:
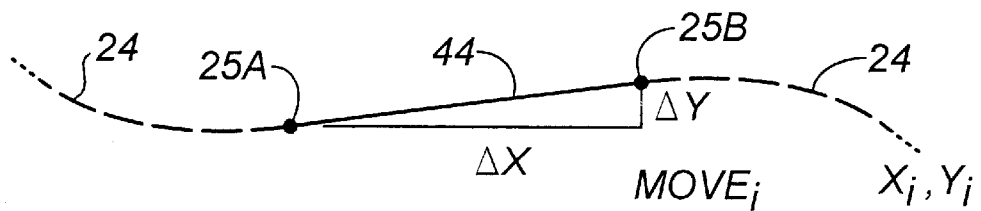
FIGS. 10a–10c illustrate the initial determination of a minimum desired move time.
Figure 10B:
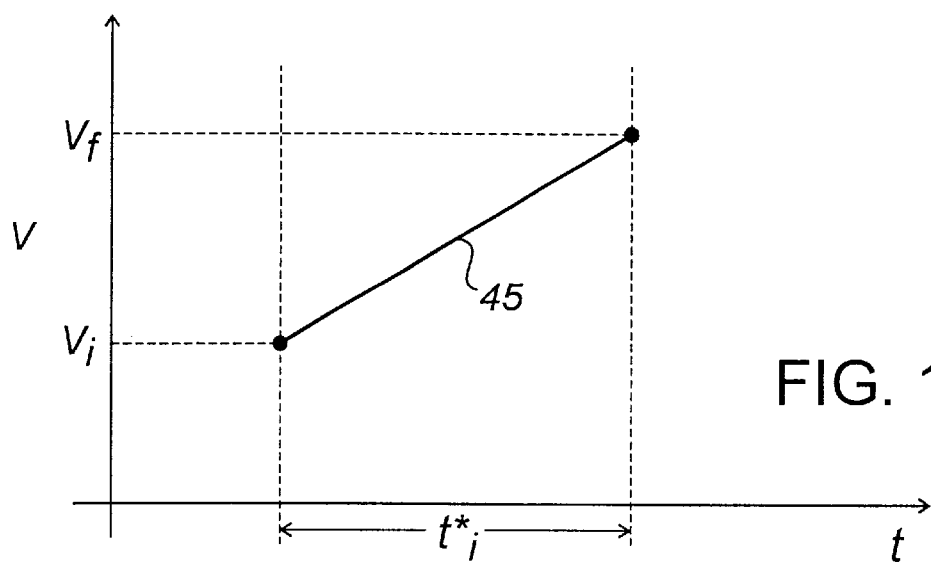
Figure 10C:
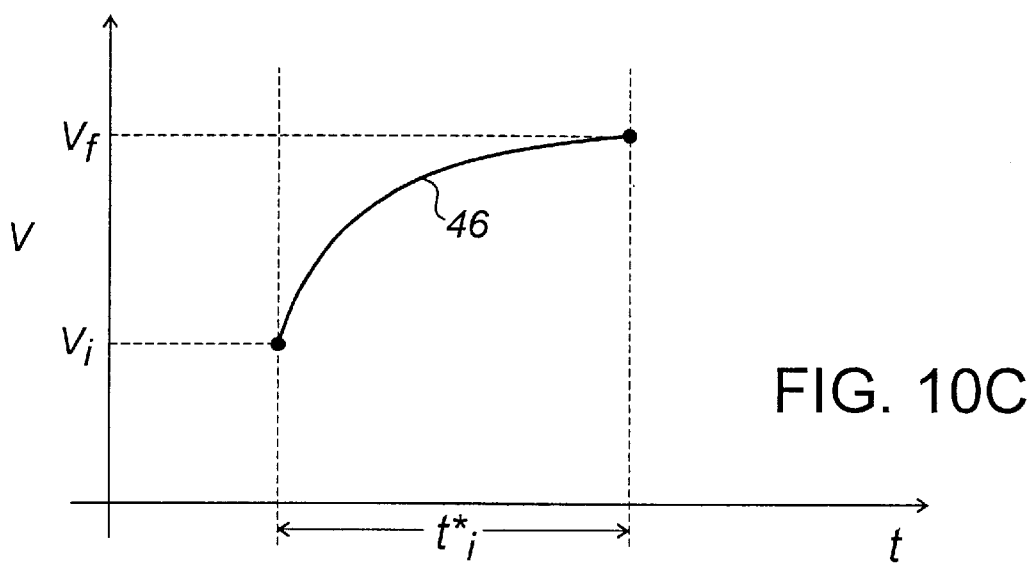

To begin with and having reference to FIG. 10a and 10c, and per block 40, a minimum desired time t* for the distance that must be traveled for each move 24 is initially and simply determined as the time necessary to move from the beginning of the move 24 at its initial velocity ($v_i$) to the end of the move under certain extreme conditions (i.e. $a_{max}$ or $v_{max}$). Two approaches to setting a velocity profile are tried, the resultant calculated times to be tested and further optimized below.

A portion of a polyline 21 is shown in FIG. 10a. A linear potion 44 (one discrete move 24) is selected for demonstrating the determination of desired time t*. Two possible profiles 45,46 are applied sequentially (the equations for a linear vector or move are depicted. Similar equations can be derived for curved moves):
a. per FIG. 10b, a profile 45 is established assuming constant maximum acceleration $a_{max}$ from the start to the finish of the move so, knowing $s=v_o t+½ a_{max}t^2$ one can solve for the minimum desired move time t* as $$t^* = \frac{-v_o + \sqrt{v_o^2 + 2a_{max}x}}{a_{max}}$$

and further, $v_f=v_o+a_{max}t$.

If the velocity $v_f$ reached at the finish of the move is unacceptably greater than maximum permitted velocity $v_{max}$ then remove the constraint for constant acceleration and
per FIG. 10c, apply a $3^{rd}$ order equation to establish profile 46 with the final velocity at maximum and not to exceed maximum acceleration So, knowing $s = v_o t + \frac{1}{2} a_{max} t^2 + b t^3$ one can solve for b as $$b = \frac{x - v_o t - \frac{1}{2} a_{max} t^2}{t^3}$$

and knowing $v_f = v_{max} = v_o + a_{max} t + 3 b t^2$ then one can solve for minimum desired move time t* as $$t^* = \frac{-(2v_o + v_{max}) + \sqrt{(2v_o + v_{max})^2 + 6 a_{max} x}}{a_{max}}$$

in which $v_{max}$ has not been exceeded.

For curved moves the equations are similar but have angular velocity, acceleration and angle of the curve ($\omega$, $\alpha$ and $\Theta$ respectively) being inserted for v, a and x respectively. Curved moves are constrained to have a constant angular acceleration $\alpha$.

The resultant minimum desired move time t* is determined to be less than the system minimum time $t_{min}$ then the move time t* is then reset to be equal to $t_{min}$. Due to the nature of the short moves in a typical task, usually the minimum desired move time t* is found to be less than the system minimum move time $t_{min}$.

Accordingly, once the time t* is reset to a longer minimum system time $t_{min}$, the velocity required to cover the same move distance will be less than the maximum permitted velocity.

Velocity Profiles and Ranges

Figure 11:
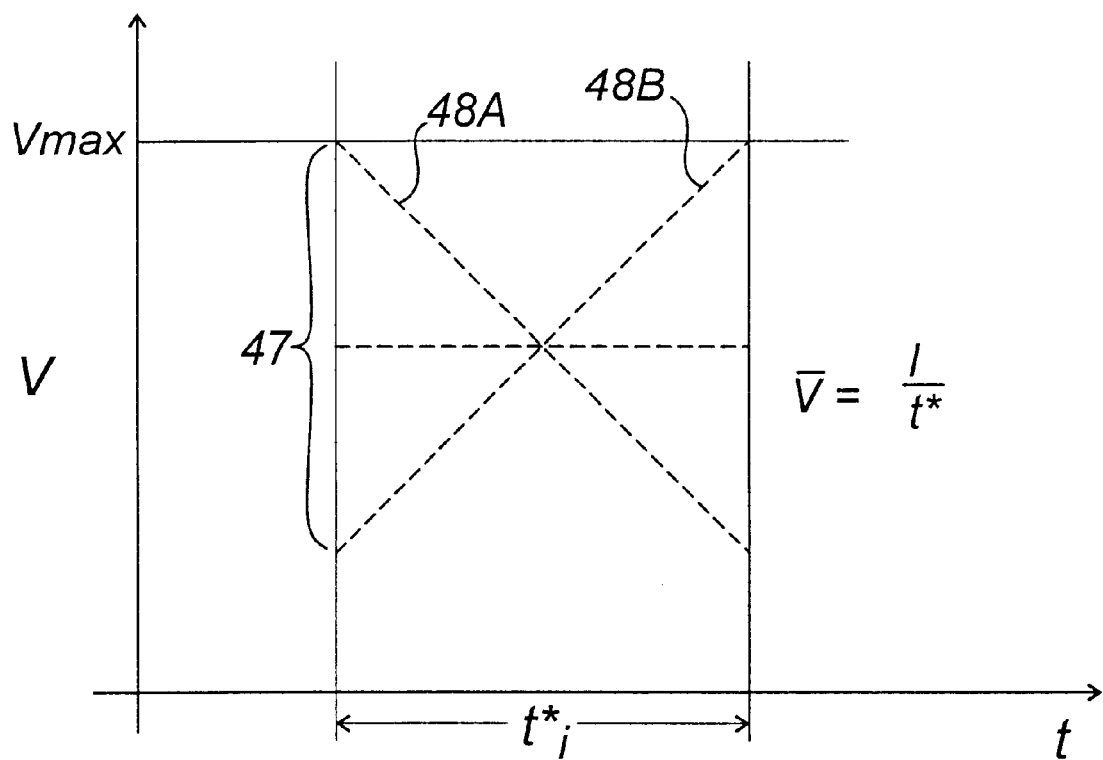
FIG. 11 is a chart illustrating a range of velocities representing the displacement through the move.
Figure 14A:
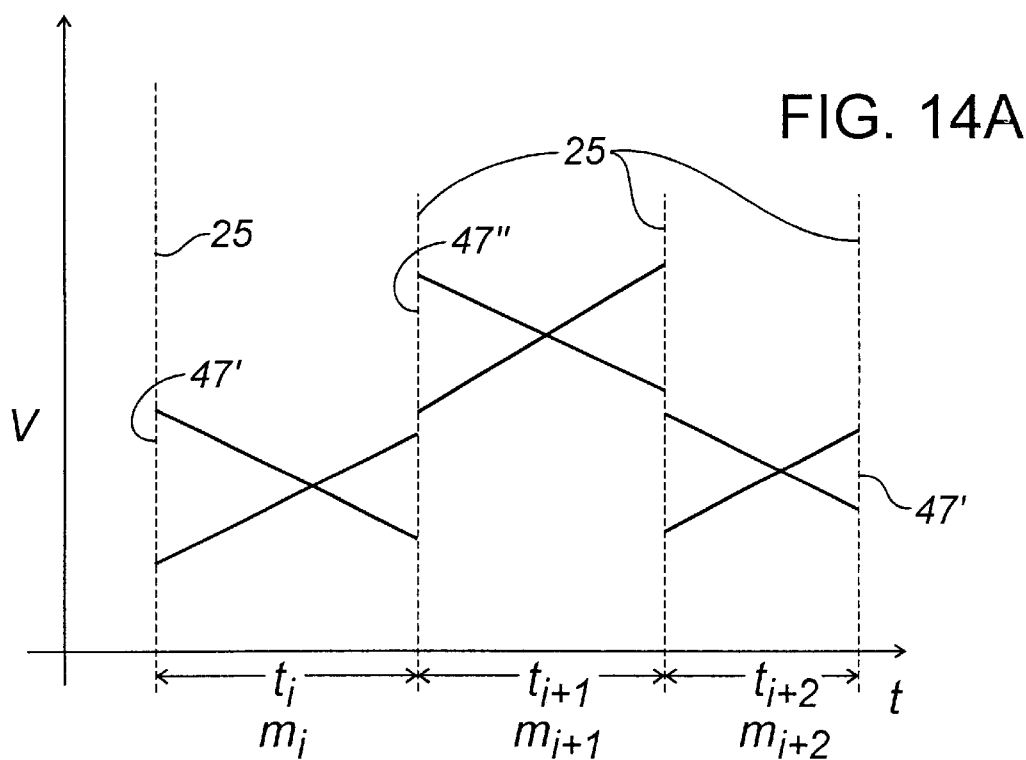
FIG. 14a illustrates velocity ranges for three adjacent moves.
Figure 14B:
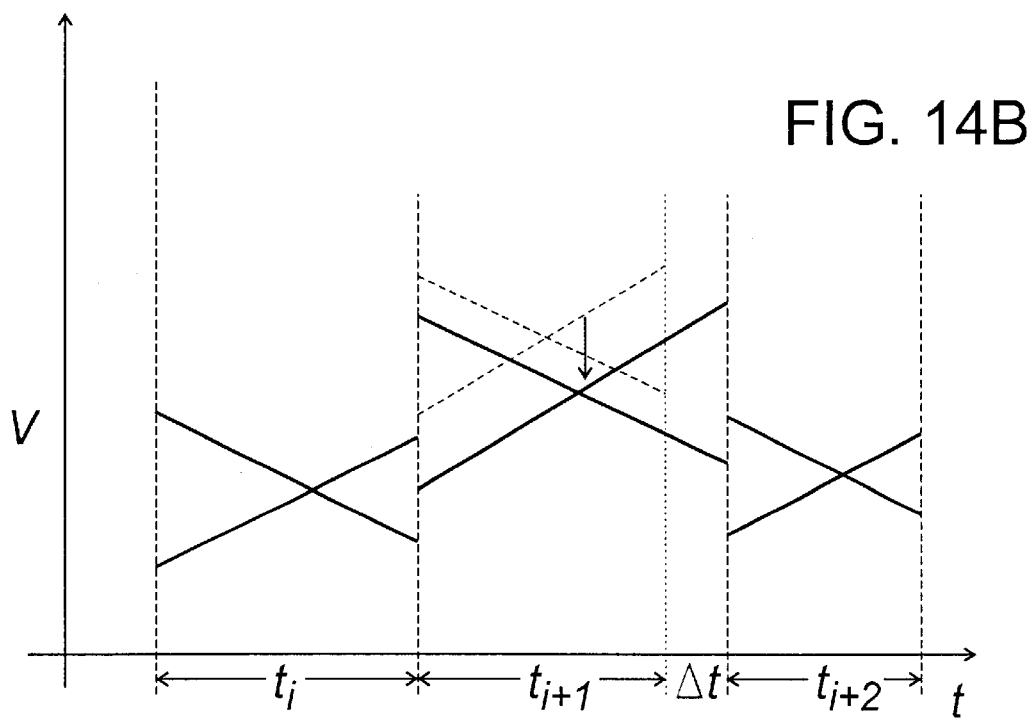
FIG. 14b illustrates the downward adjustment of the velocity range of the middle move to overlap the ranges of the adjacent moves.
Figure 15A:
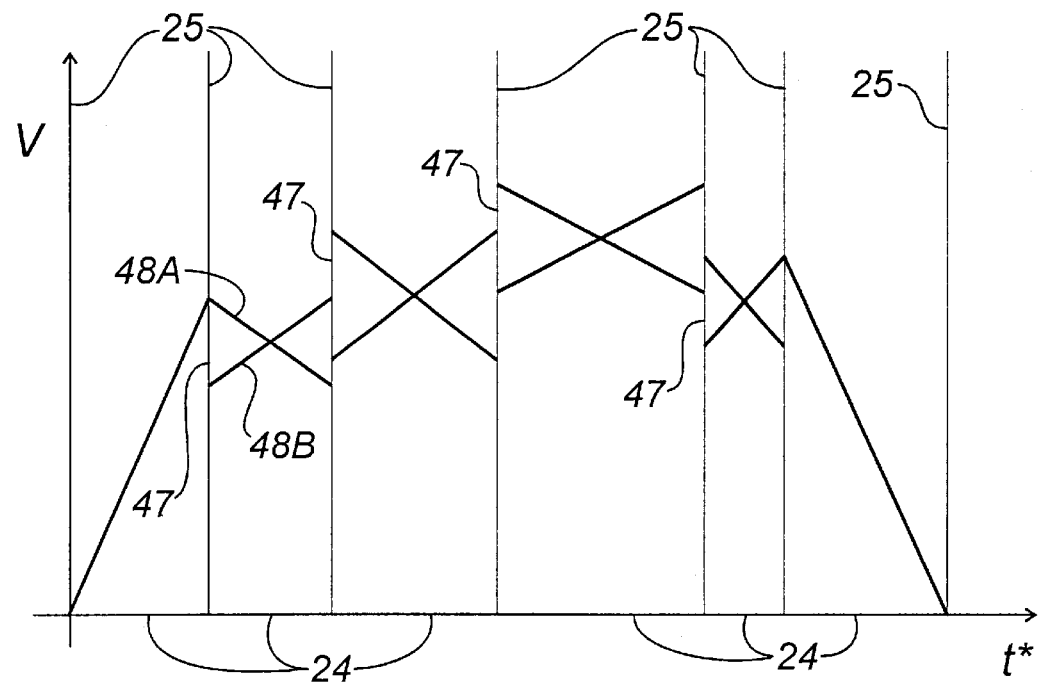
FIG. 15a illustrates adjusted velocity ranges for the six adjacent moves of a continuous cut line.
Figure 15B:
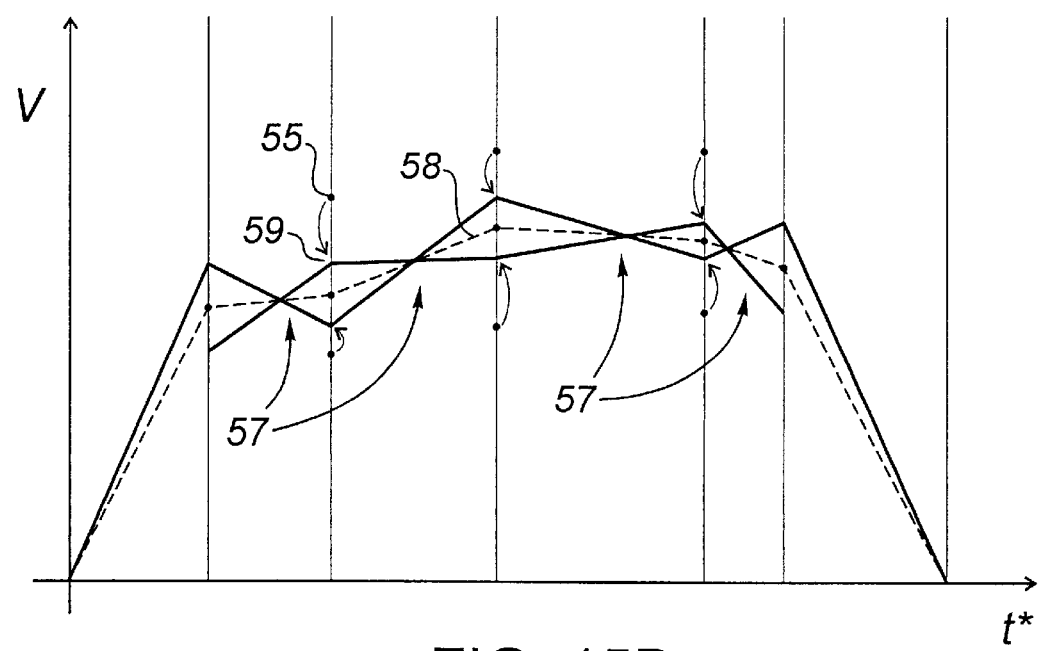

Next, as shown in FIG. 11, a range 47 of possible velocity profiles 48a,48b is determined for each move. Many possible profiles could be determined and thus each move 24 may have significantly different possible minimum times for completing their discrete move. Ultimately, as shown in FIGS. 15a, 15b, a continuous velocity curve 58 must be fitted through the velocity range 47 determined for each move 24 and thus must have at least one possibility for a common velocity at each adjoining move 24. Accordingly, as shown in FIG. 14a, 14b after ranges for possible velocity profiles 48a,48b are determined for each move 24, they are adjusted so that they overlap.

The velocity profiles 48a,48b are still subject to such practical constraints like: integer time, maximum velocity, and the maximum acceleration permitted. Accordingly, a finite number of profiles could be found.

Previously, the minimum desired move time t* was computed. Based upon t*, ranges of velocities as a function of time are generated.

Referring to FIG. 15a, and recalling that a polyline 21 comprises one or more moves 24, the resulting velocity curve 58 starts a line 31 with the first move at zero velocity and the final move ending at zero velocity. No incremental minimum move time is permitted to be less than the minimum system move time $t_{min}$.

Independent ranges 47 of velocities are produced for each move 24, often being discontinuous between adjacent moves. The ranges are characterized by having:

at the start of the move, a maximum start velocity, and a minimum start velocity; and at the end of the move, a maximum final velocity, and a minimum final velocity.

A first bounding velocity profile 48a will extend between the maximum start velocity and the minimum final velocity.

Correspondingly, the second bounding velocity profile 48b extends between the minimum start velocity and the maximum final velocity.

Other than the initial and final moves, the velocity ranges 47 for a move 24 are initially symmetrical, meaning the maximum start velocity is deemed to be the same as the maximum final velocity, and the minimum start velocity is the same as the end of a minimum final velocity. If the profiles are linear, then the range has the appearance of an "X".

As shown in FIG. 14a, examining one discrete move 24, and disregarding its influence on adjacent (preceding and successive moves), a plurality of profiles 47 can be generated.

Generally, velocity profiles 48a,48b are sought which do not exceed system maximum velocities or system maximum acceleration. Note that by testing for and preventing accelerations greater than the maximum acceleration, the start $v_1$ or final velocities $v_f$ for that move may be altered. This means the end velocity $v_f$ for the previous move may be adversely affected. Accordingly, it is necessary to re-iterate the analysis and recalculate the final velocity of the previous move, and so on until the maximum acceleration is not breached in the current move and each previous move.

Regardless of the resulting velocity profile 48a,48b, the area thereunder must equal the move distance.

Constraints

When determining velocity profiles 48a,48b certain constraints must be met. Time cannot be measure in anything but discrete integer values.

Obviously, as described above, the velocity cannot exceed $v_{max}$ or be less than zero. Further, accelerations cannot exceed $a_{max}$. Accelerations constraints include both positive and negative (deceleration) $-a_{max} < a < +a_{max}$.

Note that maximum acceleration is dependent upon the physical apparatus used and that may vary between the X and the Y axis. Accordingly, the value of $a_{max}$ for the move vector is determined as a vector calculated from the actual maximum system acceleration $ax_{max}$ in the X axis, separately from that permitted along the Y axis $ay_{max}$. The X and Y maximums are weighted from X and Y components of the move vector, the resultant vector $a_{max}$ being the maximum acceleration for the move vector.

Velocity Profile Functions—Maximums

Referring to FIGS. 12a–12d, various functions are applied to determine the velocity profile, the simplest of which is a straight line 49 ($1^{st}$ order for velocity). Additional profiles 50, 51 can be determined from a $2^{nd}$ order velocity relationship.

Briefly in overview, given move length (l) and a minimum desired move time t* profiles are determined as follows:

(a) a linear profile 49 is applied at constant maximum acceleration;

(b) if initial velocity is less than zero then try a $3^{rd}$ order polynomial 50; and (c) if the resulting final acceleration is greater than $a_{max}$ then constrain the final acceleration to be $a_{max}$ and recalculate the final velocity—which will be lower for profile 51.

More specifically, in its simplest form, starting from the initial velocity (zero for the first move and likely non-zero for subsequent moves), and accelerating at a constant acceleration at the maximum acceleration permitted, one will seek a linear relationship which will reach the highest velocity within the move. The maximum velocity reached at the end of the move could be the system maximum velocity or higher.

Knowing $x = v_1 t + \frac{1}{2} a_1 t^2 + b t^3$, then at $t^*$ the equation becomes $l = x(t^*) = v_1 t^* + \frac{1}{2} a_1 t^{*2} + b t^{*3}$ and the first derivative in time is $v_f = v(t^*) = v_1 + a_1 t^* + 3 b t^{*2}$. One may define average velocity as $$\overline{v} = \frac{l}{t^*}.$$

Figure 12A:
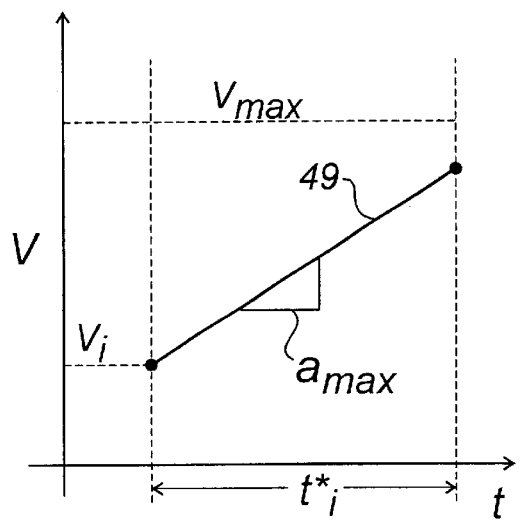
FIGS. 12a through 12d illustrate the iterations required to find the maximum velocity in the range of FIG. 11.
Figure 12B:
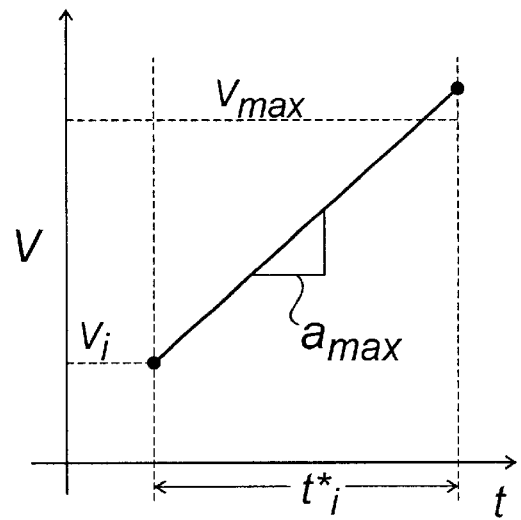

In summary for linear profile 49, and in FIG. 12*a*, if initial and final acceleration is maximum or $a_{max}$ then b=0 and $$v_f = v_l = \frac{2l - a_{max} t^{*2}}{2 t^*}.$$

In a first case, if the resultant calculated $v_i$ is equal to or greater than zero then the maximum and final velocity $v_f$ is the calculated value of $v_1$.

Figure 12C:
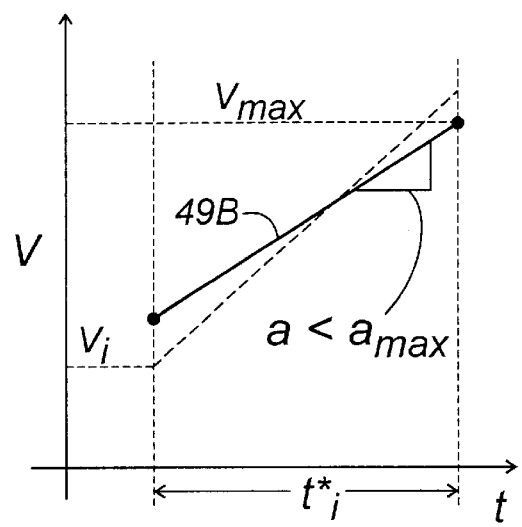

If $v_i$ turns out to be less than zero (unacceptable, FIG. 12*b*) then try a first pass $3^{rd}$ order analysis. Optionally, as shown in FIG. 12*c*, the linear relationship can be rescaled 49*b* to cause $v_f$ to be $v_{max}$, pivoting about $t^*/2$ and thus $v_i$ will rise—the area under the profile 49*b* remaining the same.

Figure 12D:
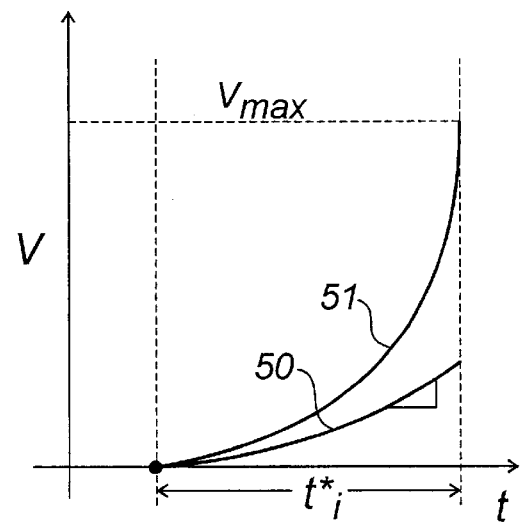

For a $3^{rd}$ order profile 50 per FIG. 12*d*, set the initial velocity $v_1$ to zero, and the initial acceleration $a_i$ is also set to zero and then $x(t^*)=l=bt^{*3}$ and thus $$b = \frac{l}{t^{*3}} \text{ and } a_f = \frac{6l}{t^{*2}}.$$

If the calculated value for $a_f$ is less than or equal to $a_{max}$, then $v_f$ is deemed to have been maximized and can be calculated as $$v_f = \frac{3l}{t^*}.$$

Otherwise, per profile 51, also FIG. 12*d*, if the $a_f$ is greater than $a_{max}$ (unacceptable) then try a first pass $3^{rd}$ order analysis where the initial velocity $v_1$ is set to zero, and the final acceleration $1_1$ is set to $a_{max}$ then $$b = \frac{a_{max} t^{*2} - 2l}{4 t^{*3}} \quad \text{and} \quad a_f = \frac{6l - a_{max} t^{*2}}{2 t^{*2}} \quad \text{and}$$

$$v_f = \frac{6l - a_{max} t^{*2}}{2 t^{*2}} + \frac{3 a_{max} - 6l}{4 t^*} = \frac{6l - a_{max} t^{*2}}{4 t^*}$$

For curved moves the equations are similar but have ω, α and Θ being inserted for v, a and x respectively. Angular acceleration α must be constant.

Velocity Profile Functions—Minimum

Briefly, an having reference to FIG. 13*a* through 13*d*:
(a) a linear profile 52 is applied at constant maximum negative acceleration;
(b) if the initial velocity is greater than maximum velocity then try $3^{rd}$ order polynomial 53; and
(c) if the resulting final acceleration is greater than $a_{max}$ then constrain the final acceleration to be $-a_{max}$, initial velocity to be $v_{max}$ and recalculate the final velocity for profile 54.

Figure 13A:
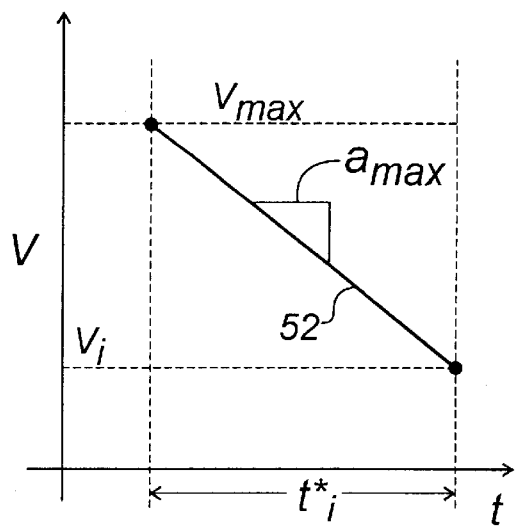
FIGS. 13a through 13d illustrate the iterations required to find the minimum velocity in the range of FIG. 11.
Figure 13B:
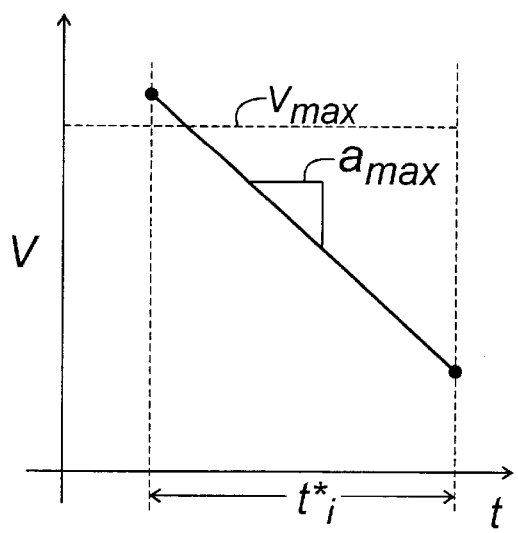

More specifically, for a linear profile 52 as shown in FIG. 13*a*, starting from the move's initial velocity, and decelerating at a constant maximum acceleration permitted ($-a_{max}$), then b=0 and $$v_t = \frac{2l + a_{max} t^{*2}}{2 t^*}.$$

As long as the resultant calculated $v_i$ is less than or equal to $v_{max}$ then the minimum velocity $v_f$ is equal to the calculated value of $v_i$.

Figure 13C:
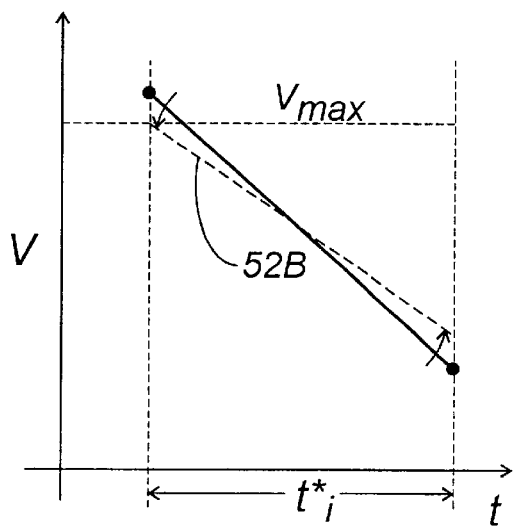

If $v_i$ turns out to be greater than $v_{max}$ (unacceptable, FIG. 13*b*) then try a first pass $3^{rd}$ order analysis. Optionally, the linear relationship can be rescaled 52*b* to cause $v_i$ to be $v_{max}$, pivoting about $t^*/2$ and thus $v_f$ will rise—the area under the profile remaining the same (FIG. 13*c*)

Figure 13D:
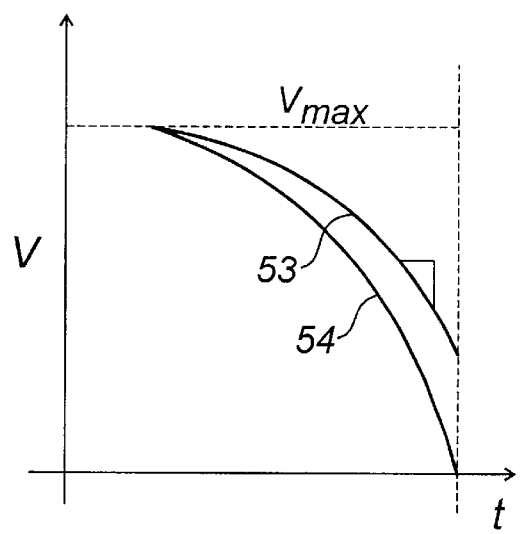

For a $3^{rd}$ order profile 53, shown i FIG. 13*d*, the initial velocity $v_i$ is set to zero, and the initial acceleration $a_1$ is also set to zero and then $x(t^*)=l=v_{max} t^* + b t^{*3}$ and $$\text{thus } b = \frac{-l + v_{max} t^*}{t^{*3}} \text{ and } a_f = \frac{6(l - v_{max} t^*)}{t^{*2}}.$$

If the calculated value for $a_f$ is greater than or equal to $-a_{max}$, then $v_f$ is deemed to have been minimized and can be calculated as $$v_f = \frac{3l}{t^*} - 2 v_{max}.$$

Otherwise, per profile 54, also shown in FIG. 13*d*, if the $a_f$ is less than $-a_{max}$ (unacceptable) then try a first pass $3^{rd}$ order analysis where the initial velocity $v_i$ is set to $v_{max}$, and the final acceleration $a_f$ is set to $-a_{max}$ then $$b = \frac{vmax t^* - l - \frac{1}{2} a_{max} t^{*2}}{2 t^{*3}} \text{ and}$$

$$a_f = \frac{1}{2} \left( a_{max} + 6 \left( \frac{l - v_{max} t^{*2}}{t^{*2}} \right) \right) \text{ and}$$

$$v_f = -\frac{1}{2} v_{max} - \frac{1}{4} a_{max} t^* + \frac{3l}{2 t^*}$$

For curved moves the equations are similar but have ω, α and Θ being inserted for v, a and x respectively. Angular acceleration α remains constant.

It is easiest to describe the process if one assumes (for illustrative purposes) that all ranges 47 are defined by linear lines. Accordingly, the ranges 47 are represented by symmetrical or horizontally extended X shapes. As shown in FIGS. 14*a* and 14*b* the resulting relationships are represented by "X", "X". . . .

The objective is to put a velocity curve or continuous velocity line through each range from the start at zero velocity to the end at zero velocity. The velocity must be continuous.

Not all ranges 47 will overlap in velocity. Accordingly, the high velocity ranges 47" are adjusted downwardly to overlap with the lower velocity ranges 47'.

The easiest first correction of a next adjacent high velocity range 47" is to take the minimum start velocity $v_1$ 55 for the high range 47", and match it with the maximum final velocity $v_f$ 56 for the previous low range 47'. Note that the method for reducing the velocity range 47 is to increase the time Δt for the move 27. As time is measured in integers of the smallest time increment, and thus the resulting recalculation of the minimum start velocity $v_1$ 55 is likely to be lower than, and will not exactly match with, the maximum final velocity $v_f$ 56 of the previous move.

This is a recursive analysis, requiring each previous move 24 to be re-examined after a correction.

Having reference to FIGS. 14a and 14b, once all of the velocity ranges overlap, then each velocity range 47 for each discrete move 24 is adjusted so that:

the new minimum start velocity is equal to the greater of
        the minimum start velocity for that move, and
        the minimum final velocity for the previous move; and
    the new maximum starting velocity for that move is the lesser of
        the maximum start velocity for that move, and
        the maximum final velocity for the previous move.

Correspondingly, the new minimum final velocity is equal to the greater of
        the minimum start velocity for the next move, and
        the minimum final velocity for the current move; and
    the new maximum final velocity for that move is the lesser of
        the maximum start velocity for the next move, and
        the maximum final velocity for the current move.

At this point the ranges 47 which were symmetrical (FIGS. 14a,14b,15b), are now asymmetrical 57 (FIG. 15b).

A continuous velocity curve 58 is fitted through all of the ranges 57 of all the discrete moves 24. A curve fitting routine does not necessarily create a smooth curve, and as a first pass, simply intersects the midpoint of the range 57 at each transition between moves 24. The velocity at each move intersection 25, while having the same value, is not necessarily tangent with the adjacent velocity profiles.

At this point we have a velocity curve 58 which provides the shortest overall time for traversing that polyline 21. This velocity curve 58 can be fed directly to the motion controller 15 and achieve an optimized cutting speed.

Discrete Move Optimization

Having reference to FIGS. 16a–16d, further optimization can be realized by seeking out moves which are particularly long (greater than a multiple of the minimum system move time $t_{min}$). Each move 24 can be analyzed to determine whether it can be subdivided into smaller sub-moves 60. Smaller moves 60 permit more direct and quicker achievement of maximum velocity, rather than some $3^{rd}$ order function. constraints such as to integer distance and minimum time $t_{min}$ continue to apply and must be adhered to.

Move times are optimized by modeling the velocity. The move velocity is modeled as a quadratic or more preferably, a piece wise differential (linear) function. The first piece of the velocity function is a period of acceleration. The second piece of the velocity function is a period of constant velocity. The third piece of the velocity function is a period of deceleration. For curves the corresponding pieces are angular acceleration as you enter the curve, constant angular velocity through the curves and angular deceleration as you exit the curve.

The minimum division of a move 24 is into two sub-moves 60, an acceleration and a deceleration portion. If the move time is less than two times the minimum system move time $t_{min}$, then performing a subdivision is worthless, as each sub-move cannot be less than $t_{min}$.

For achieving three sub-moves 60 (FIG. 16d) for enabling acceleration, constant velocity and a deceleration, then the total move time must be in excess of 3 times $t_{min}$.

Figure 16A:
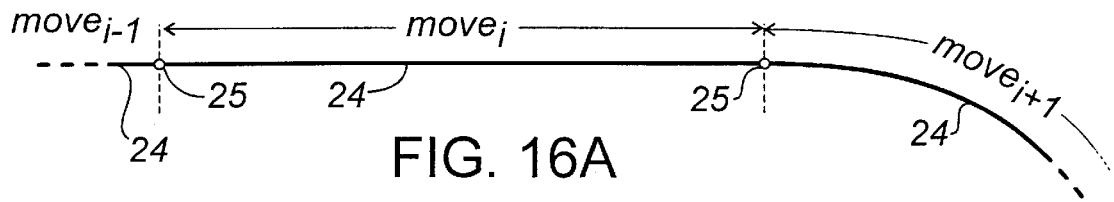
FIGS. 16a and 16b illustrate a partial cut line having one long move and its corresponding continuous velocity optimized velocity profile.
Figure 16B:
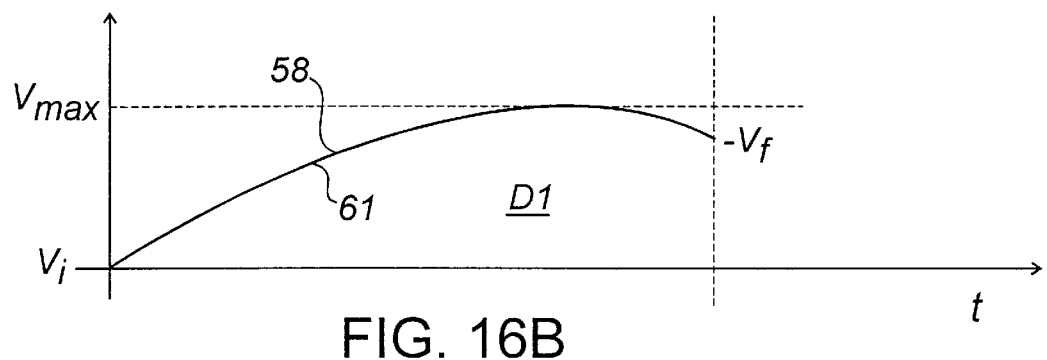
Figure 16C:
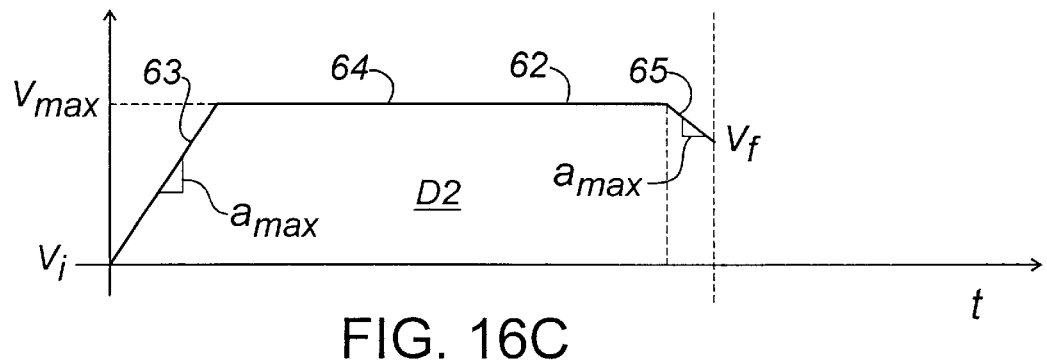
FIGS. 16c and 16d illustrate and ACD optimized velocity profile for the move of FIG. 16a and the new sub-moves created therefrom.

For example, and having reference to FIG. 16a, a move 24 can be quite long, say six inches requiring far greater than 3 times $t_{min}$ to complete. The velocity range optimization 40–43 may have resulted in a polynomial fit 58 or profile 61, as shown in FIG. 15b, for the move 24. In fact it would be more efficient, shown in FIG. 16c, to assign a velocity profile 62 which utilizes constant maximum acceleration 63 until maximum velocity is reached then maintaining that velocity constant 64 for substantially the remainder of the move. Sufficient time is reserved at the end of the move to utilize maximum negative acceleration 65 to return to the final velocity calculated earlier optimized polynomial fit.

Figure 16D:
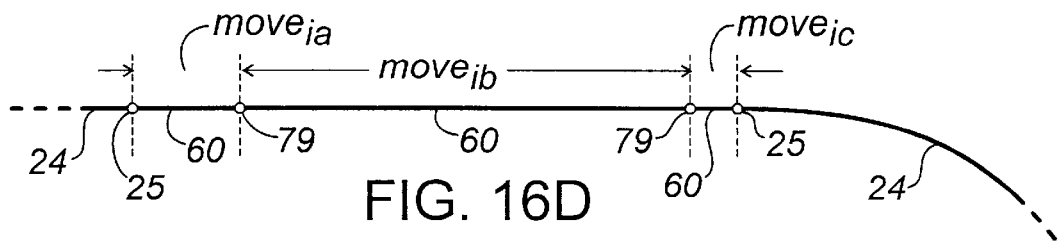

In other words, long uncomplicated moves can be subdivided into shorter, more time efficient sub-moves (FIG. 16d). Clearly, if the calculated time for the long move is less than two times the minimum system move time, then no action is performed because each sub-move would then be less than the minimum system move time and that would be an inappropriate solution.

Figure 17:
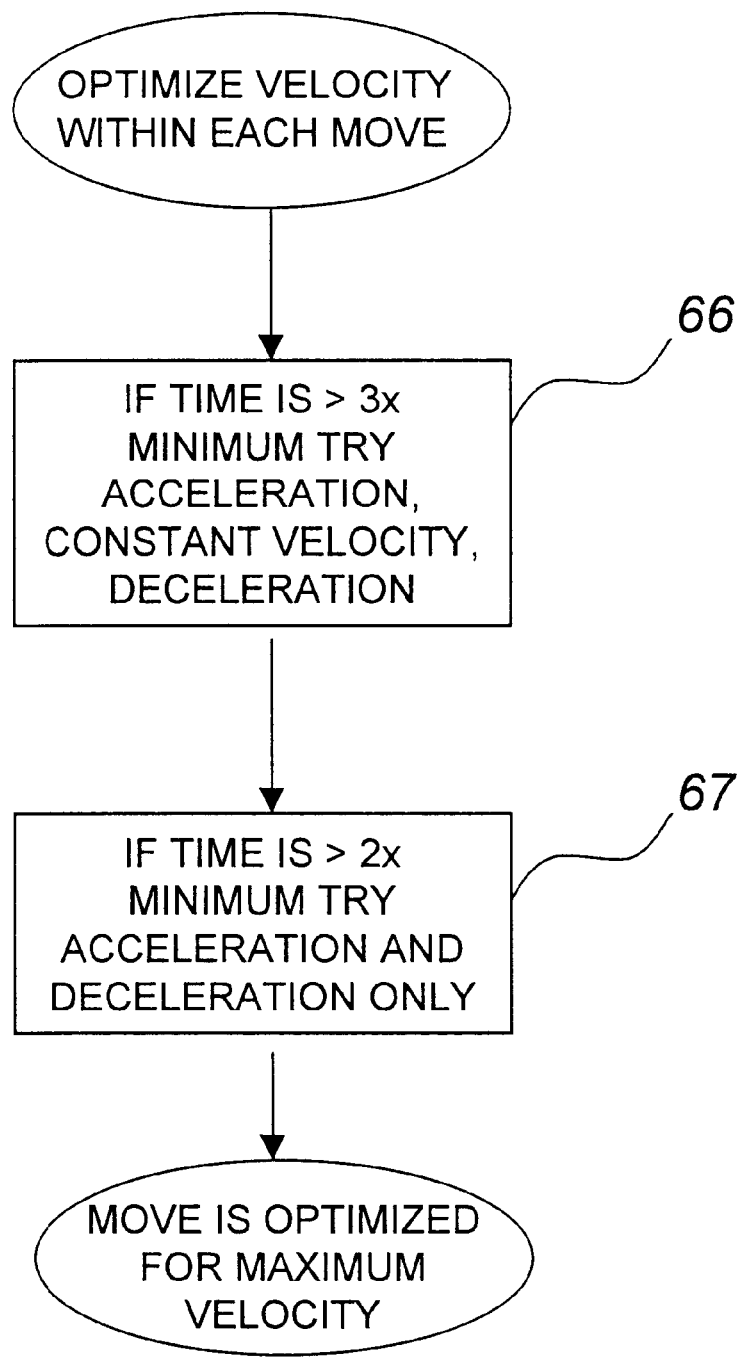
FIG. 17 is a flow chart illustrating the tests applied for whether ACD or AD optimization is appropriate.
Figure 18:
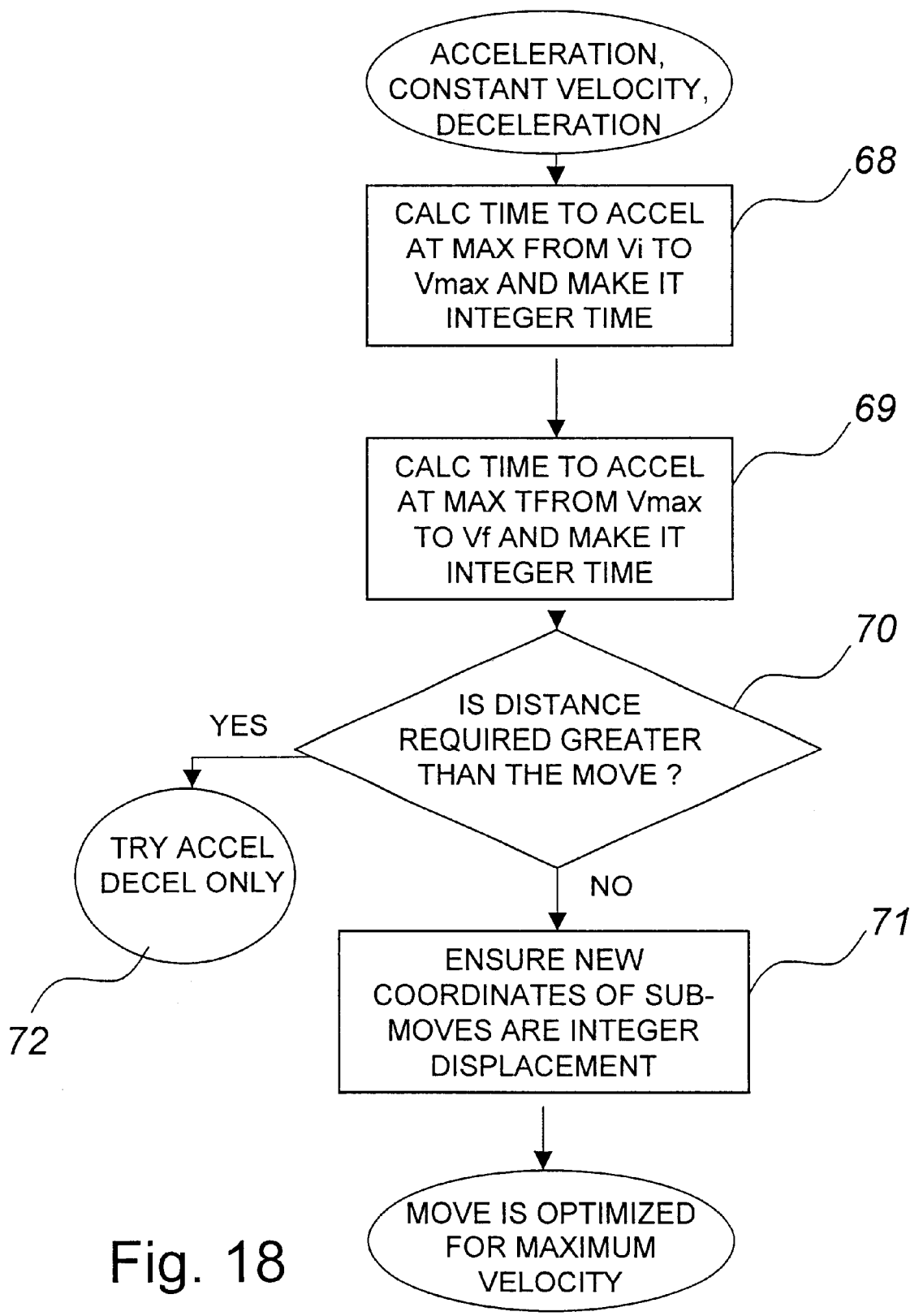
FIG. 18 is a flow chart illustrating ACD optimization.
Figure 19:
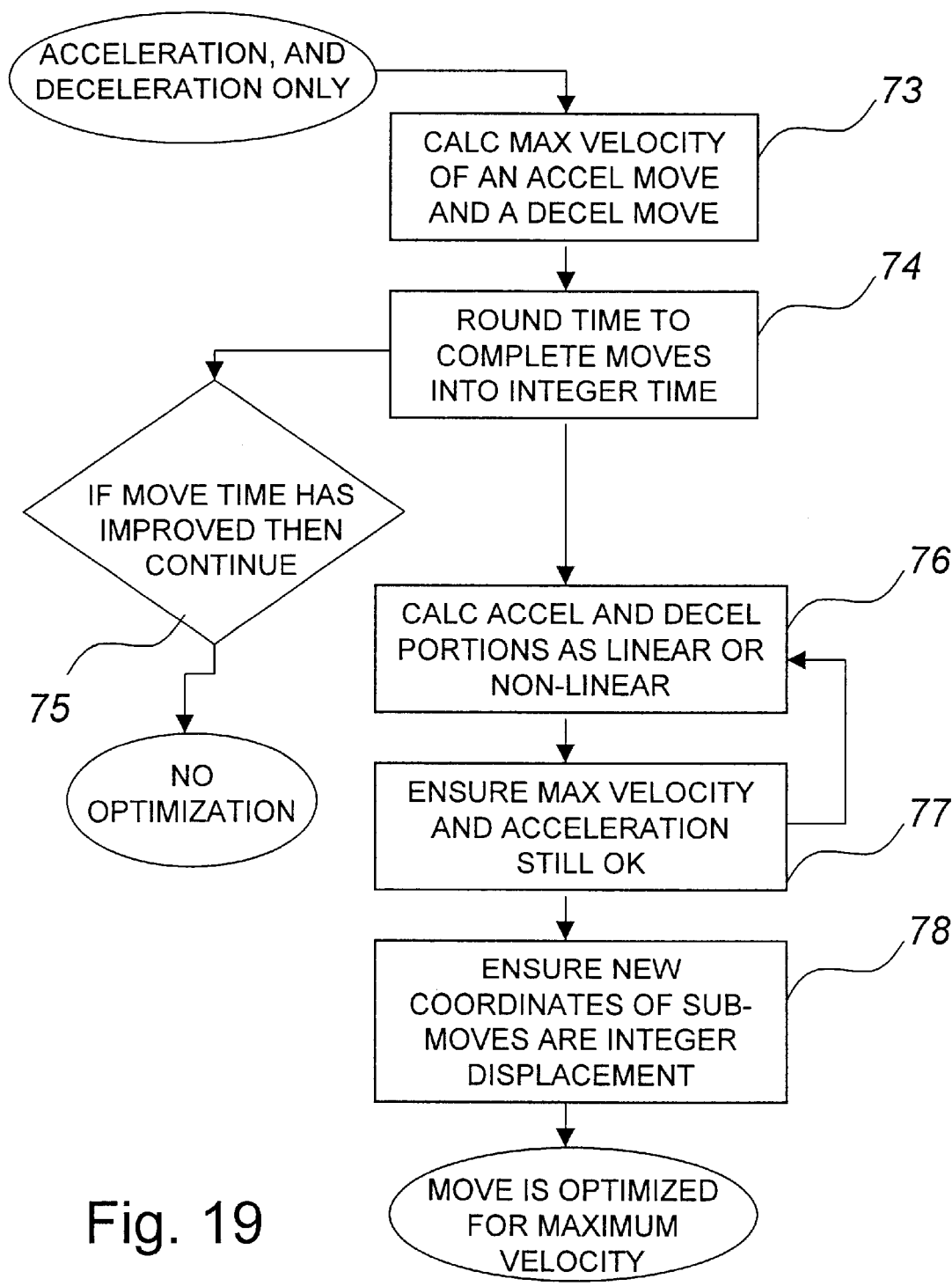
FIG. 19 is a flow chart illustrating AD optimization.

Having reference to FIGS. 17–19, a move 24 is tested against minimum system time $t_{min}$ to establish if it even qualifies for further optimization. At block 66, if the required time is greater than 3 times the system minimum move time then try applying an acceleration, constant velocity, deceleration optimization (ACD), as is shown in FIG. 16d. At block 67, if the required time is between 2 and three times, then try acceleration and deceleration sub-move optimization (AD) only.

Referring to FIG. 18, the time necessary to accelerate from the initial velocity to $v_{max}$ is calculated at block 68. Then, at block 69, the time necessary to decelerate at maximum deceleration from $v_{max}$ to $v_f$ is calculated. These times are converted to integer time by rounding up. At block 70, if the distance required to achieve the above to conditions is greater than the move itself, then ACD optimization is not available for this move and can try AD optimization and go to block 72.

Otherwise, at block 71, if the calculated distance is less than the move length then a constant velocity portion 64 can be fit in and the move time can be successfully reduced using ACD. If the maximum velocity is exceeded when recalculated, then try applying non-linear velocity rise and fall portions 64,65, based on the maximum velocity $v_{max}$.

Turning to FIG. 19, for AD optimization, the time necessary to accelerate from the initial velocity to $v_{max}$ and back down is determined at block 73. Once again, per block 74, these times are converted to integer time by rounding up. At block 75, if the time has been improved, then proceed to block 76 for maximizing velocity and minimizing time using constant acceleration. At block 77, check if velocity maximums or accelerations are exceeded, and if so try non-linear rising and descending velocity portions, with their maximum at $v_{max}$. If maximums cannot be met, then sub-move AD optimization falls.

The initial and final velocities $v_i,v_f$ originally determined in the velocity range optimization must be maintained. The new velocity profile 62 for the new sub-moves 60 is recalculated to fit the original move displacement.

For an AD optimization (FIG. 18), two new coordinates or intersections 79 are created, forming three sub-moves 60,60, 60 from one move 24. For AD optimization (FIG. 19), one new intermediate coordinate or intersection 79 is created, forming two sub-moves 60,60 from one move 24.

Because time and displacement are measured as integers, significant errors can be introduced into the position of the coordinates of the new sub-move intersections 79.

Accordingly, at block 78, the coordinates of the new intersections 79 are rounded to the nearest integer. The rounding process may move the new velocity profile 62 outside either maximum acceleration or maximum velocity. Accordingly, it may be appropriate to increase time for the sub-moves 60 sufficiently so that they comply with the velocity acceleration constraints. Overall, subdivided moves may still be more effective and shorter time than the long optimized move. Reduction in time is illustrated by the shortened time axis in FIG. 16c or that in FIG. 16a. Note that the area D1 under the curve 61 and the area D2 under the new velocity curve 62 must be the same, evidencing the same move displacement.

Once again, these new coordinates, which signals a geometry change, must be tested for tangential continuity between moves 24, sub-moves 60,60 and 60, and moves 24.

Occasionally a sub-move may in fact violate the max acceleration constraint by a small margin. One may optionally set a tolerance for exceeding maximum acceleration. An acceleration error term is provided which is a function of displacement over time squared. If the acceleration error is excessive, then a time increase of one integer time unit is added for reducing the acceleration error. Change in acceleration is a function of time squared per $$\Delta a \approx \frac{6\Delta x}{\Delta t^2}.$$

Often merely adding one time unit (which is then squared) is sufficient to bring the acceleration error within bounds.

The philosophy is that one may be able to accept occasional over shoot up the maximum acceleration. Typically this is set at 10 to 15 percent off maximum acceleration. Simply, the response is an increase in dimensional error. This is caused by the flexion of the gantry and pushing of the linear servo motors 5a, 5b, 5c.

If we drive the linear servo motor 5a, 5b, 5c hard, it may over shoot its point and "ring". Note that the X and Y coordinates are absolute, but the movement is subject to oscillation about set point.

After all optimization, the moves and sub-move data is stored in the data array (FIG. 8) for feeding to the motion controller 15. The motion controller outputs ΔX, time, start velocity (usually from the previous move) and final velocity.

Even though the controller 15 operates in relative distance ΔX, the controller always keeps track of how many encoder points it has traversed and how many more it has to move (ΔX). For instance, if the gantry were to be forcibly moved beyond the designated encoder point, then it would seek to return to that point. If you were to use stepper motors, which use relative positioning without positional feedback, they would have no reference point upon which to return.

The X-Y positioner 1 and laser nozzle 4 can be instructed where to move, but this must be coordinated with the movement of the conveyor 14 for fastest operation.

Continuous Conveyor Movement

Next, the motion profile of the conveyor 14 is determined.

In one sense this is quite easy, wherein the time necessary to make all the cuts for that bite are known, the length of the bite is known, and thus one can determine the conveyor 14 movement necessary to process this bite. More challenging is ensuring identical start and end velocities of the conveyor 14 as it enters and exits a bite (enter a bite from the previous bite and exit the bite to enter the next bite).

To avoid "jerk" or a change in the rate of acceleration, the start velocity of one bite should be the same as the end velocity of the previous bite. The velocities are matched by smoothing the conveyor's velocity profile. Accelerations should be the same. Occasionally, the smoothing method produces a negative velocity. This is unacceptable in highly accurate cutting due to the need therefore to reverse the conveyor 14. Backlash or hysteresis in the conveyor 14 drive would introduce an unacceptable error in the laser 7 positioning.

Accordingly, the start and end velocities of that bite are iteratively reduced to reduce the area under the ends of the velocity profile which causes the negative portion of the profile to increase (to a position value) and thereby balance the area loss. The result is to achieve the same overall distance traversed, yet without ever entering a negative velocity. Note that after this adjustment, acceleration over the curve is no longer continuous.

Figure 20A:
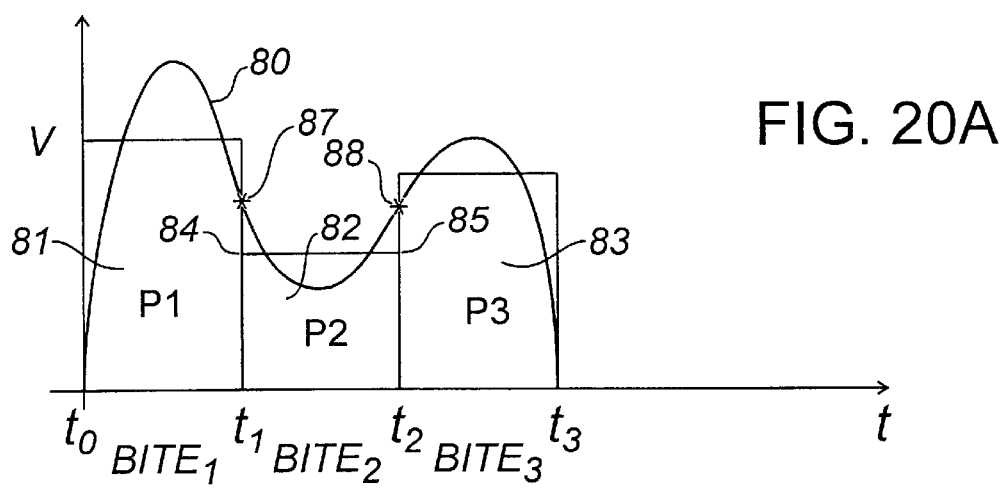
FIGS. 20a–20c illustrate the motion conveyor profile optimization.
Figure 20B:
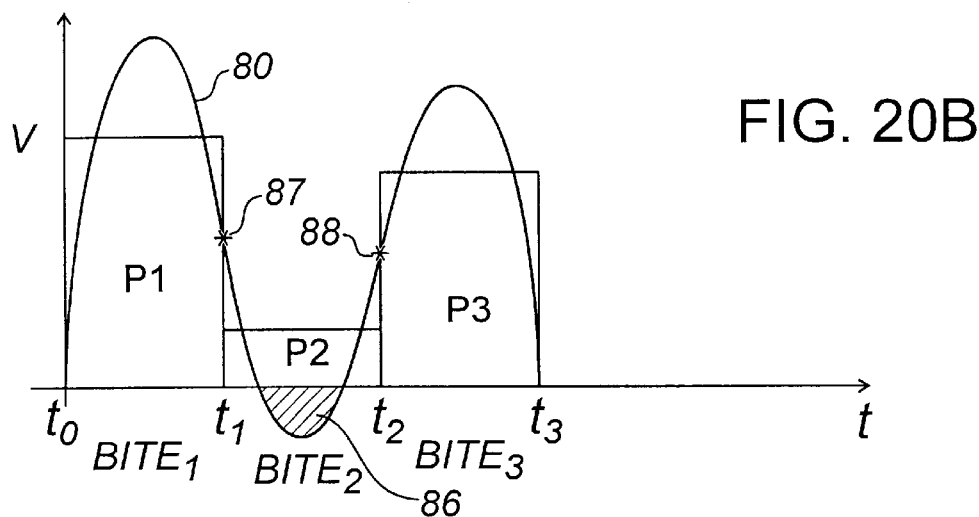
Figure 20C:
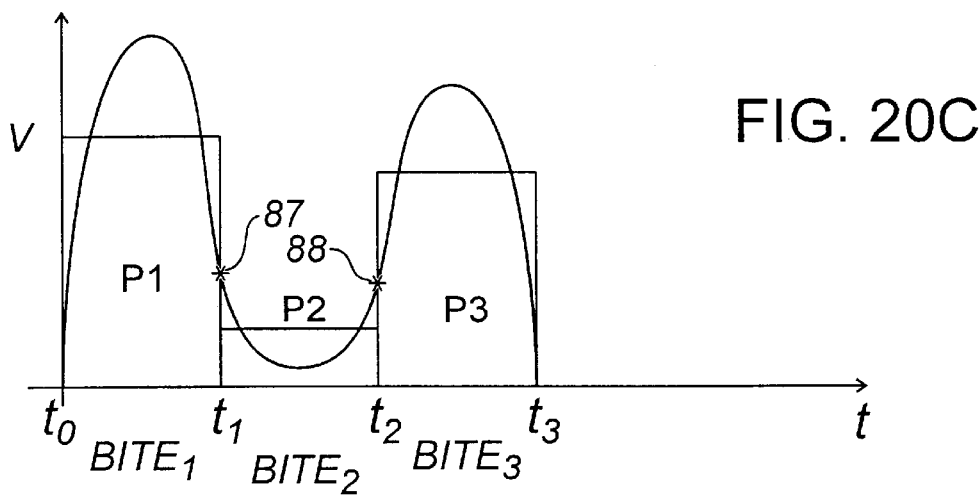

Having reference to FIGS. 20a–20c, a chart illustrates a velocity curve 80 of the conveyor 14 over time. The area under the curve represents conveyor displacement or position. FIG. 20a illustrates the average velocities for three bites 81,82,83 shown having differing velocities at their bite interfaces 84,85. Accordingly the velocities are discontinuous. Discontinuity results in a jerk.

The velocity of the conveyor is fit to ensure continuous velocity at the interfaces 84,85.

First, we make all the velocities and accelerations match at bite boundaries or interfaces 84,85.

The velocity is smoothed to form the curve 80, shown on FIG. 20a, using third order equations where:

$$P(t)=Ct+\tfrac{1}{2}Bt^2+\tfrac{1}{3}At^3.$$

$$v(t)=C+Bt+At^2;$$

and $$a(t)=B+2At.$$

For each bite 81,82,83 represented by i to n, where n is the number of bites (three shown), at the boundaries 84,85, $P(t)_i$, $v(t)_i$ and $a(t)_i$ must be the same as $P(t)_{i+1}$, $v(t)_{i+1}$ and $a(t)_{i+1}$. Accordingly we have 3n unknowns. The equations are solved for the coefficients A,B, and C.

The velocity solution must be checked for negative velocities and corrected or else there will not be continuous accelerations.

If the smoothed conveyor 14 velocity or motion curve 80 has a negative solution 86 (FIG. 20b), then the entire profile 80 is examined and the initial and final velocities of any bite 87,88 which has a negative velocity are lowered. The smoothing can be performed iteratively for lower and lower velocities 87,88 until no point of the velocity curve 80 is negative (FIG. 20c). The worst case will be a resultant start and end velocity of a bite which become zero. The rule for corrective lowering of the velocities is a function which is proportional to the provided velocity.

The Positioner

Figure 21:
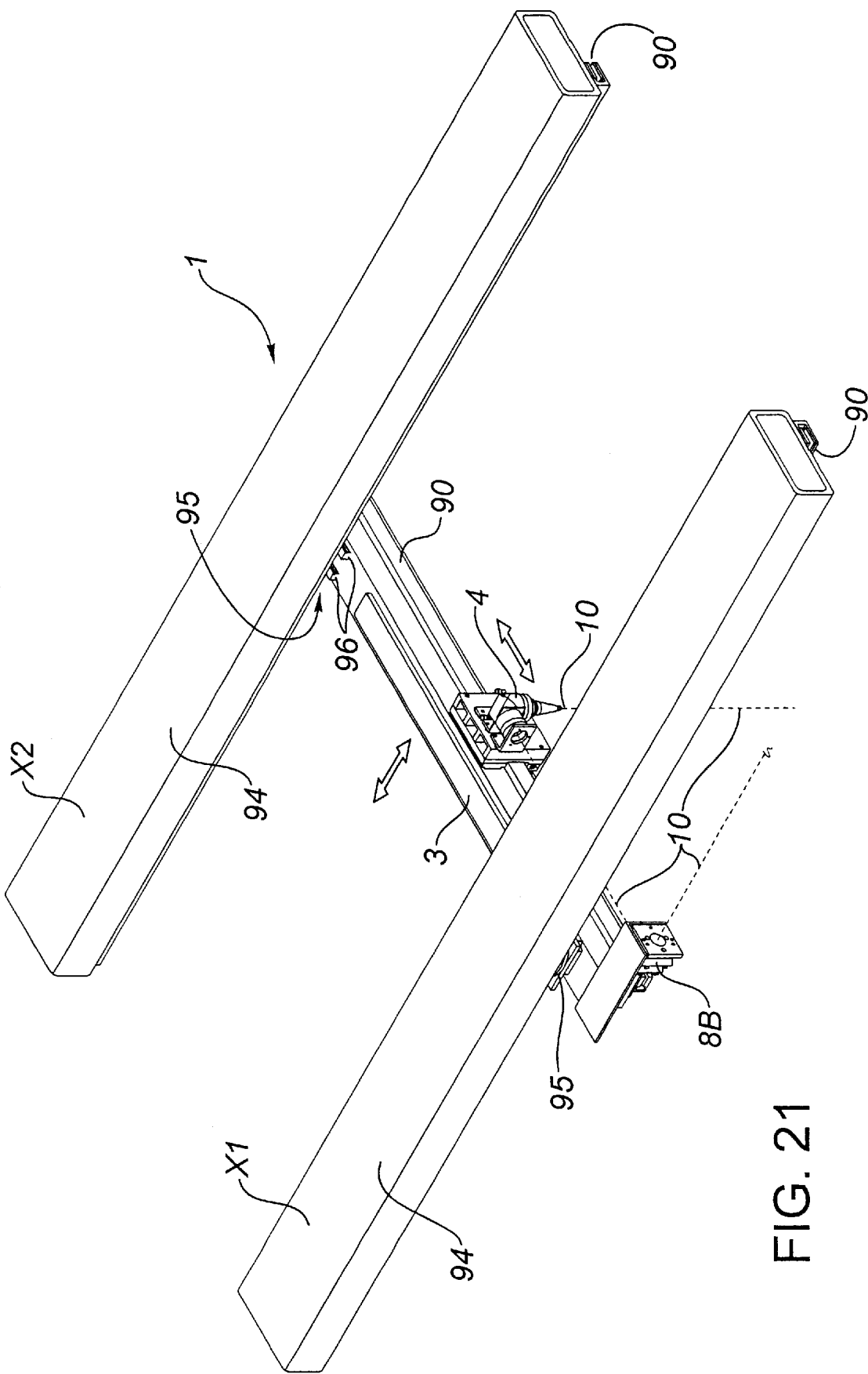
FIG. 21 is a perspective view of the X rails and Y gantry with the laser nozzle mounted thereon.

Referring once again to FIG. 1 and also to FIG. 21–25, with respect to improving the positioner 1, a lightweight Y axis gantry 3 is provided which runs on the two X axis rails X12,X2. The X-axis runs transverse to the material 13 movement and the Y-axis runs parallel. As shown in FIG. 21, when the Y gantry 3 is about ½ of the way along the X rails X1,X2 an "H" configuration results. The improved positioner 1 begins to deviate from conventional positioners by independently driving the Y gantry 3 with linear servo motors 5a,5b located at each end X1,X2 of the Y gantry 3.

A linear servo motor 5c extending along the Y gantry 3 drives the laser nozzle 4 payload (the laser head incorporating optics and mirror 8) along the gantry 3 in the Y axis, parallel to the conveyor 14 and material 13 movement. The X1 and X2 motors 5a,5b drive the Y gantry 3 transverse to the conveyor 14 motion axis to move the laser nozzle 4 in the X axis.

The use of two independent X1 and X2 motors 5a,5b permits them to be independently driven to compensate for inertial imbalance of the laser nozzle 4 at extreme ends of the Y gantry 3. It is further very easy to setup the positioner 1 on installation, permitting digital offsets to be programmed into the controller 15 and correcting the Y gantry's Y-axis to be parallel to the movement of the conveyor 14.

Figure 24:
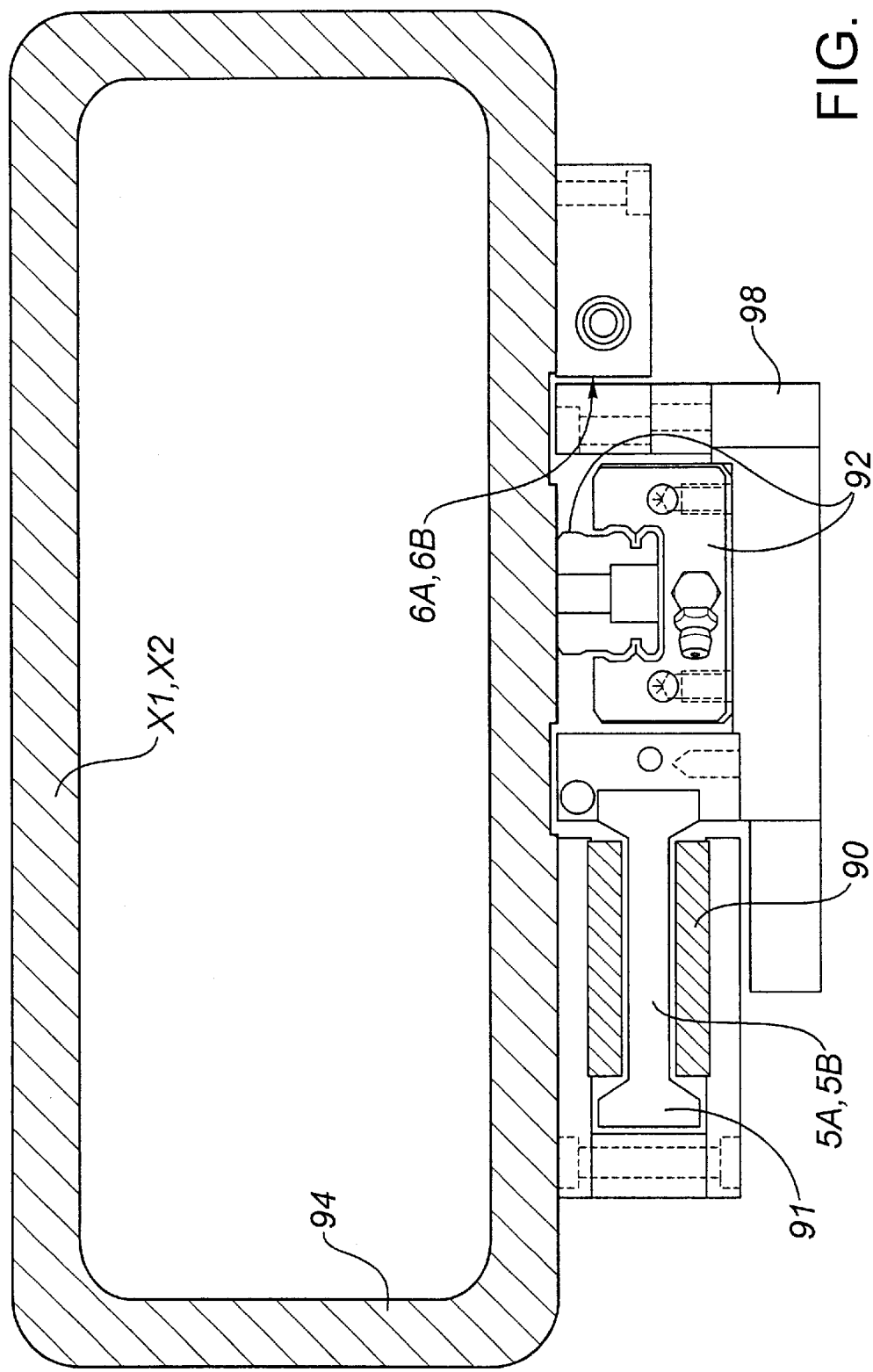
FIG. 24 is a cross-sectional view of one of the X-rails and the linear motors for one end of the Y gantry.
Figure 25:
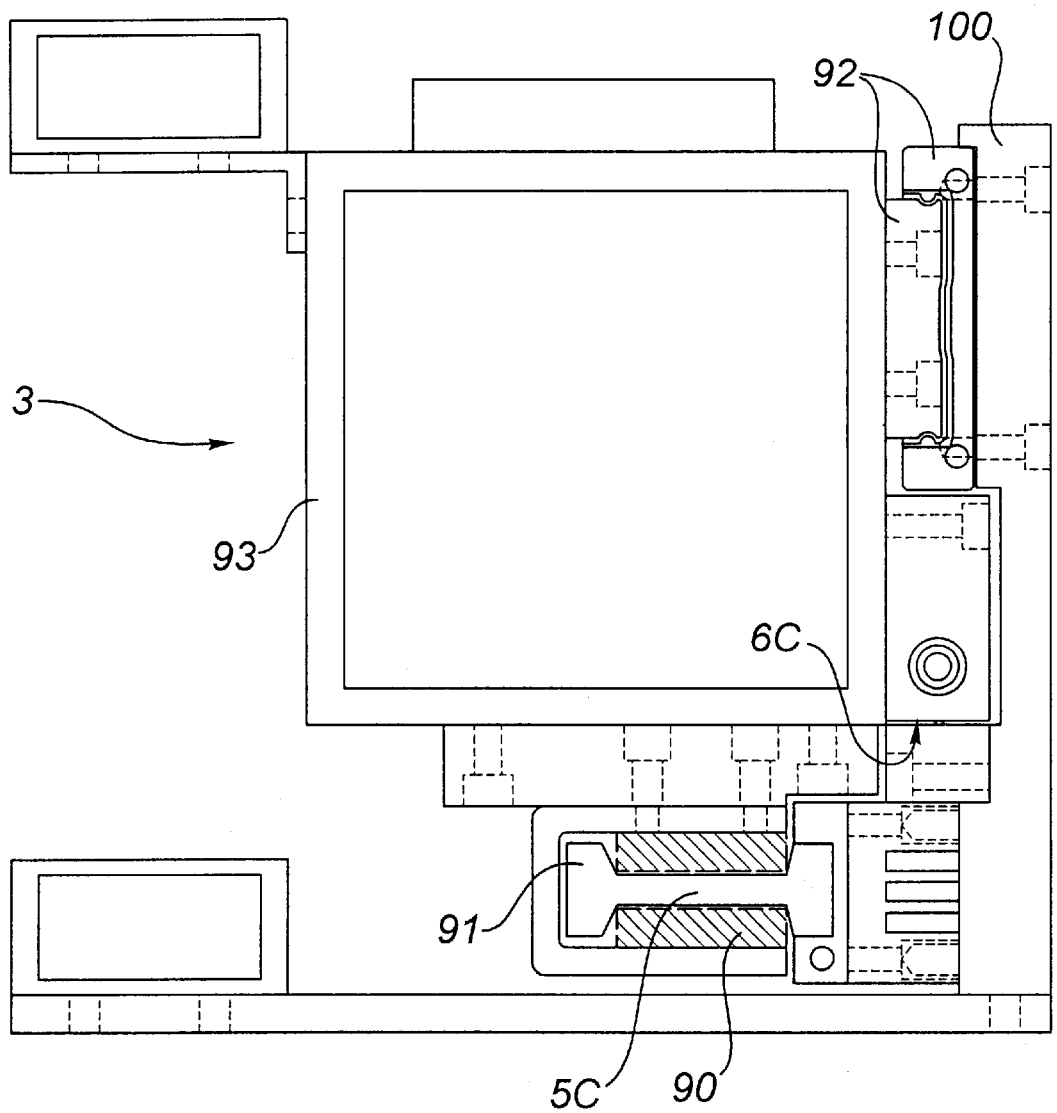
FIG. 25 is a cross-sectional view of the Y gantry and the linear motor for driving the laser nozzle (nozzle not shown).

Best seen in FIGS. 24 and 25, linear servo motors 5a,5b,5c comprise a magnetic track 90 and a coil assembly 91. The magnetic track's 90 are mounted to and are stationary on their respective X-rails X1,X2 or Y gantry 3. The coil assemblies 91 move relative to their respective magnetic tracks 90. Each end of the Y gantry 3 at the X1 and X2 servo motors 5a,5b is supported by linear bearings 92 to permit relative movement between the X-rails X1,X2 and the Y gantry 3.

Different linear servo motors 5a, 5b and 5c were used for the X1,X2 rails and for the Y gantry 3. As the linear motors 5a,5b associated with the X-rails X1,X2 are not being moved about, they can be chosen for maximum performance with reduced emphasis on their weight. The linear motor 5c for the Y gantry 3 becomes part of the moving weight and more emphasis is placed on choosing a lightweight linear motor 5c.

Accordingly, the Y gantry 3 incorporates a linear motor 5c, model LM 210, having a coil length of 5.6 inches with two Poles, generating peak force of about 30 pounds. The Y gantry 3 has a usable stroke length of 46 inches, with a maximum speed of 60 inches per second (ips), an effective acceleration of >0.8 G (maximum of 1.5 G) and inaccuracy of less than 0.020 inches.

The X1 and X2 linear motors for the X-rails are heavier, using model LM310-6P having a coil length of 15.2 inches with 6 Poles, running in a LB310M track, generating peak force of about 240 pounds. The X-rails X1,X2 provide a usable stroke length of 80 inches, with a maximum speed of 60 ips, an effective acceleration of >0.8 G (maximum of 1.5 G) and inaccuracy of less than 0.020 inches. The deflection in the Y gantry beam at 1.5 G. is less than 0.003 inches. Both of the LM210 and LM310 linear motor models 5a,5b and 5c are available from Trilogy systems Corp. of Webster, Tex.

Because the Y gantry 3 is substantially the only moving part of the positioner 1, significant design was required to provide a lightweight beam or Y gantry 3 which had sufficient rigidity to maintain laser cutting precision.

Inaccuracies are mostly mechanical and are not caused by slop in the servo loop. Dimensional inaccuracies due to the flexing of the mechanical system are in the order of 0.015", while servo loop are only 0.005".

As shown to FIGS. 21 and 24, each X-rail X1,X2 comprises large structural members, particularly 10 by 4 by ½ in. hollow structural steel tubing 94. The tubing 94 is oriented with the 10 inch profile in the horizontal plane. The large mass desirable in the X-rails X1,X2,94, allows absorption of the linear momentum created by the Y gantry 3. The linear motor magnetic track 90, and encoders, are mounted on the bottom surface of the X-rails X1,X2.

Because independent linear motors 5a,5b are used for each end of the Y gantry 3, there is the potential for the gantry to pivot as one end X1 or X2 may slightly overrun the other end X2 or X1. Coupled with the pivoting comes a translation problem.

Figure 22:
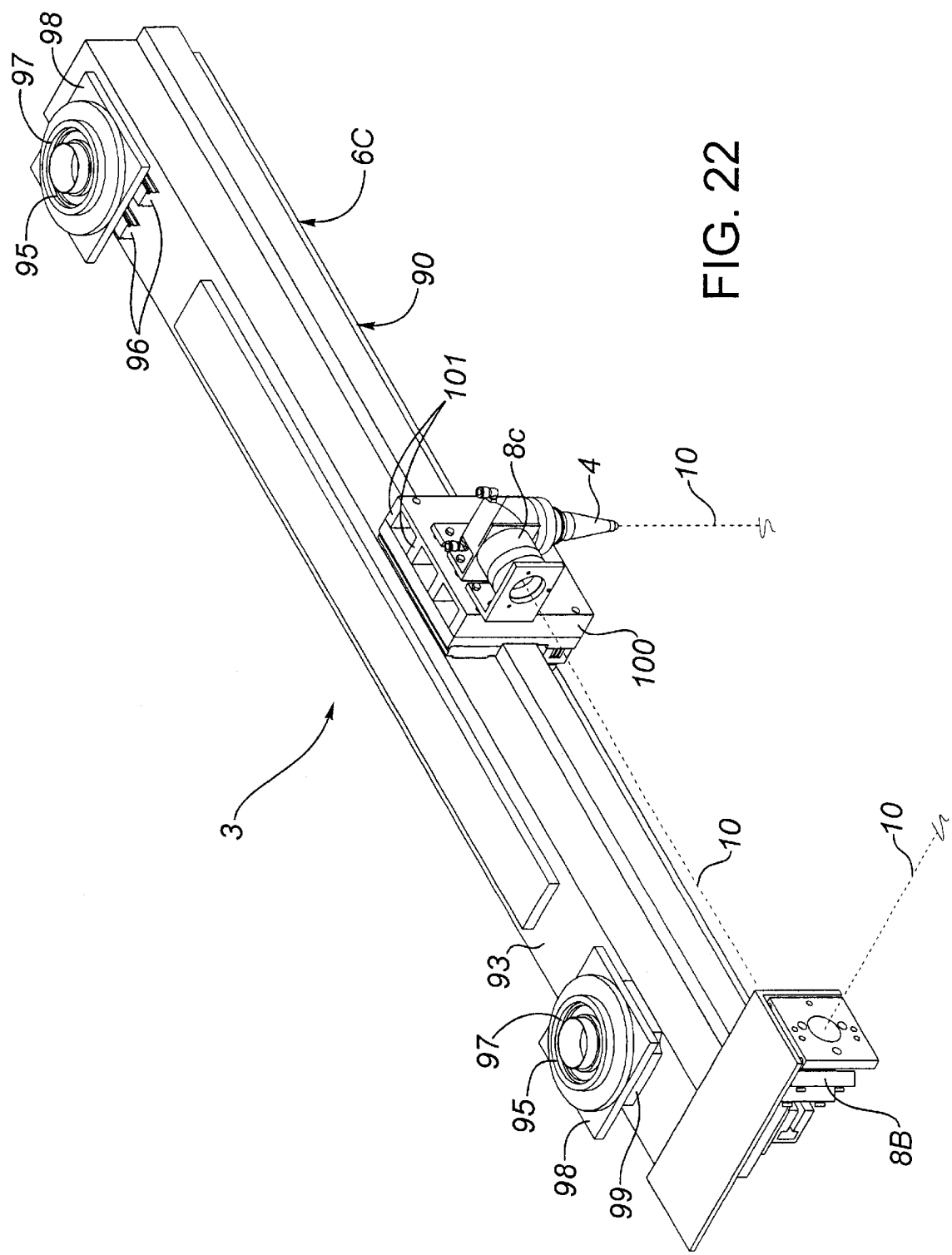
FIG. 22 is a perspective view of the Y gantry showing the pivot bearing detail and laser beam mirrors.
Figure 23:
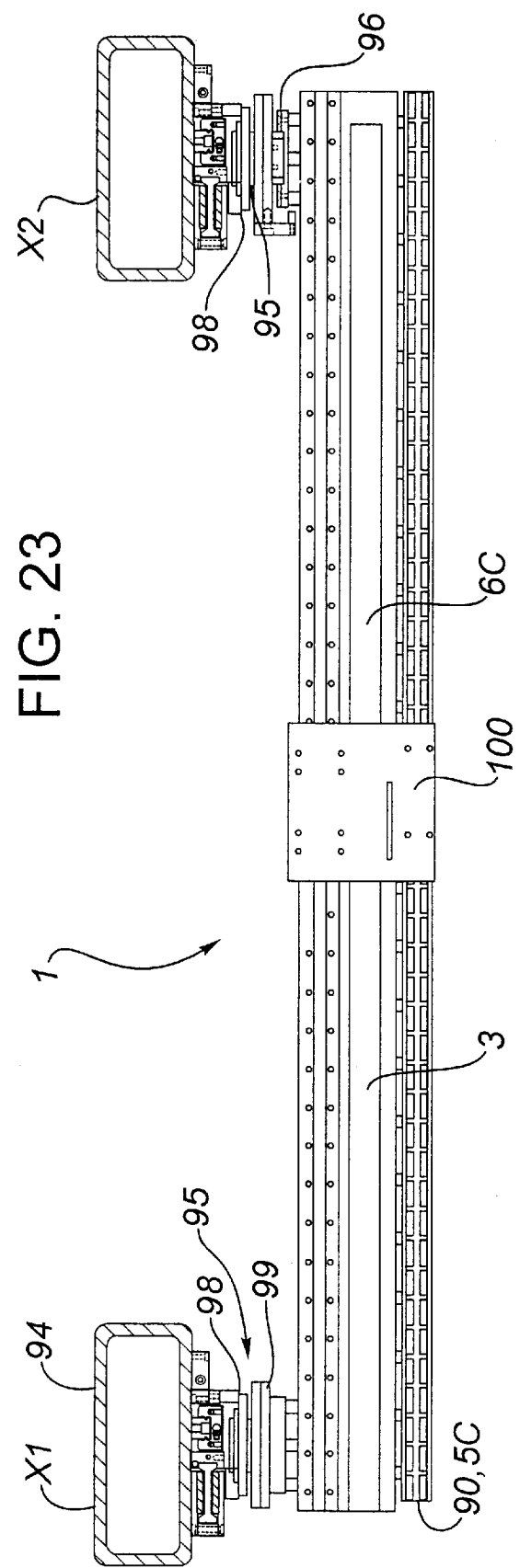
FIG. 23 is a side view of the X rails with the Y gantry hanging therefrom with the laser nozzle removed.

Having reference to FIG. 22, pivots bearings 95 are provided at each of the Y gantry 3 at the X-rails so that the Y gantry 3 can rotate slightly. A translation bearing 96, located at one end X2 of the Y gantry 3 allows the rotation to proceed without longitudinal restraint.

Pivot and translation assemblies 95,96 must be capable of handling large movements and forces, be rigid, but still be lightweight.

Unfortunately, introducing pivot and translation bearing assemblies 95,96 structurally weakens the positioner 1. Large moments are imposed upon the bearings. Large pivot bearings 97 are used for each pivot 95 namely, crossed roller bearings model CRBH 5013A, shrink fit into a strengthened X carriage plate 98 on the bearings periphery and a shaft hub 99 into its bore. The pivot bearings permit rotation only in the plane of the material and are substantially immovable otherwise.

The translation bearing 96 is a dual rail bearing system to reduce the movement. The two rail bearings are IKO Bearings, model LWES20.

Stiff connection or carriage plates 98,100 are utilized to connect the X-rails X1,X2 to the ends of the Y gantry 3. The X carriage plate 98 depends from the linear bearing running the length of the X-rails and is attached to the pivot bearings. The pivot bearings are connected to the Y gantry 32 with the shaft hub.

A Y carriage plate 100 is intermediate the laser nozzle and the Y gantry. The Y carriage plate 100 is stiffened with additional ribs 101 to ensure flexing is minimized. The Y carriage plate is also significantly stiffened as shown in FIG. 25.

One advantage of independent linear motors and gantry pivot and translation capability is the need to only precisely align one X-rail X1 or X2 perpendicular to the material 13 movement direction. Misalignment of the second X-rail will be absorbed by the pivot and translation capability, avoiding binding. The pivots 95 also advantageously mechanically de-couple the two motors 5a,5b, which permits tighter tuning without causing feeding of one motor to another and repositioning corrections and oscillation. Setup is also simplified, having the ability to angle the Y gantry 3 and thus permitting exact parallel alignment of the Y gantry 3 to the conveyor 14 movement. This can be accomplished electronically in the digital motion controller 15.

In order to control the absolute location of the Y gantry 3 end of the laser nozzle 4, linear encoders 6a,6b,6c (understood to comprise a long, stationary grating and a moving reader) and are used to provide position feedback. Due to the ultimate desire to increase accuracy of the Y gantry 3, and thereby improved acceleration and deceleration control, the encoder is high-resolution. Without high resolution feedback information, the motion controller cannot accurately position the gantry 3 and nozzle 4, or initiate starting or arresting movements and quantization errors occur. Due to the selection of magnetic field-generating linear motors for driving the positioner, the use of magnetic encoders was prohibited.

As digital controllers 15 become faster and faster, then real versus integer time and adhering to acceleration limits becomes more and more difficult. If the velocity is too great, the material 13 may no longer be cleanly cut for a given power of laser 7. Further, if the acceleration exceeds a maximum, then the positioner can overshoot its calculated coordinates and oscillate. Accordingly, tolerance of the resultant cut cannot be guaranteed.

One solution is to employ optical encoders 6a,6b,6c which have a 10× greater resolution than magnetic encoders.

In particular, a model MSA 6716 encoder 6a,6b,6c has been used successfully and is available from RSF Electronics Inc., Rancho Cordova, Calif. The MSA 6716 encoder as has a system resolution of 1 micron, with an accuracy of about 3 microns/meter, a grating pitch of 20 micron. The optical encoders are sealed and are not subject to cleaning requirements. The optical grading is light, a significant factor for use on the Y gantry 3. Previously used magnetic encoders had at a resolution of only about 10 microns, and with the new optical encoders the system resolution is improved to one micron.

A 500 watt carbon dioxide, RF excited laser 7 is provided which emits a laser beam 10 which radiates in the infrared region of the electromagnetic spectrum at a wavelength of 10.6 microns. The laser 7 is heavy and is located separately from the gantry. Mirrors 8 direct the laser beam 10 to the nozzle. A first mirror 8a redirects the laser beam along one X-axis. Another mirror 8b on the Y gantry 3 redirects the laser beam to the laser nozzle. The nozzle 4 incorporates optics 8c to direct the laser beam 10 onto the material 13.

The laser nozzle 4 is light (about 2 pounds) and the entire payload of motor 5c, Y carriage 100 and laser nozzle 4 (about 6 pounds) is mounted to the Y gantry 3. Such laser nozzles 4, and lasers 7 are available from Coherent model K500.

The use of linear motors 5a,5b permits one to install a second Y gantry 3 and laser nozzle 4 on the same linear servo stators X1 and X2.

Linear servo motors 5a,5b,5c can overheat. If subjected to sustained resistance forces over a certain magnitude. Clearly, motor failure and downtime is unacceptable when achieving speed is the objective. Conventional analysis enables one to determine when a motor will overheat when it is subjected to substantially continuous load over time. But, when a system is subjected to a wide range of acceleration and coasting it is not so straightforward. Note that should a cut pattern 12 be invariant, one can determine the maximal acceleration to avoid motor damage. However, when each pattern 12 can be different, it is likely that some patterns 12 will cause the motor to be subjected to repeated and sustained acceleration which could overheat the motor. Accordingly, it is preferably to implement a dynamic predictive motor load system.

While moving, the resistive force is a function of the motor's acceleration. The effective or RMS force for each move can be determined from the PVT sequences anticipated for the motor. Force is proportional to motor heating. The PVT for a particular pattern 12 determine the predicted acceleration over time. Currently, the maximum acceleration is reduced if the RMS is exceeded. Optionally, given a motor's heat tolerance under continuous force over time, then one can review the anticipated effective force through a sequence of moves and compare the effective force to the pre-determined force and then adjust (reduce) the maximal permitted acceleration of the pattern 12 and adjust the PVT for the positioner so as to avoid motor overheating.

It is anticipated that the linear motor 5c on the Y gantry 'can be replaced with lightweight belt drives (not shown), which would reduce the weight of the Y gantry 3 a further 20 pounds due to the loss of the linear motor magnets 90.

The advantage of a lighter gantry 3 is a combination of the ability to reduce the stiffening structure X1,X2,94 and 98,100, further reducing the gantry weight and ultimately resulting in better acceleration and less overshoot.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above, and of U.S. provisional application 60/067,366, filed Dec. 2, 1997, are hereby incorporated by reference.

From the foregoing description, one skilled in the art can easily ascertain the essential characteristic of this invention, and without departing from the spirit and scope thereof, can make various changes and modifications of the invention to adapt it to various usages and conditions.

The embodiments of the invention in which an exclusive privilege or property is claims are as follows:

1. A method of minimizing the time taken to move a tool along a continuous path of a plurality of discrete geometric moves, the tool having movement parameters including velocity (v) and acceleration (a) and being constrained to a maximum tool velocity ($V_{max}$) and acceleration ($a_{max}$), and each move having a displacement (L), the method comprising:
   (a) establishing an initial minimum move time ($t^*_i$) to move the tool through each move's displacement (L) given the tool's maximum tool velocity ($V_{max}$) and acceleration ($a_{max}$);
   (b) establishing a bounding velocity range of start and final velocity profiles of each move which satisfy the move's minimum move time ($t^*_i$) and do not exceed the tool's maximum velocity ($V_{max}$) and acceleration ($a_{max}$),
      (i) the first profile having a maximum start velocity ($V_i$) for the tool entering the move and a minimum final velocity ($V_f$) leaving the move, and
      (ii) the second profile having a minimum start velocity ($V_i$) for the tool entering the move and a maximum final velocity ($V_f$) for the tool leaving the move;
   (c) increasing the initial minimum time ($t^*_i$) for each move ($m_{i+1}$) where that move's minimum start velocity ($V_i$) is greater than the maximum final velocity ($V_{max}$) for an adjacent previous move ($m_i$) or that move's ($m_{i+1}$) minimum final velocity ($V_f$) is greater than the maximum start velocity ($V_i$) for an adjacent following move ($m_{i+2}$) and then re-establishing the velocity range for that move ($m_{i+1}$);
   (d) establishing an adjusting velocity range for each move ($m_{i+1}$) so that,
      (i) an adjusted minimum start velocity ($V_i$, $m_{i+1}$) is equal to the greater of the move's minimum start velocity ($V_i$,$m_{i+1}$) and an adjacent previous move's maximum final velocity ($V_f$,$m_i$), and
      (ii) an adjusted maximum start velocity ($V_f$) is equal to the lesser of the move's maximum start velocity ($V_i$,$m_{i+1}$) and the previous move's maximum final velocity ($V_f$,$m_i$); and
   (e) fitting a continuous velocity curve through the adjusted velocity ranges of each move so as to calculate tool velocity (v) and acceleration (a) which minimizes the time for traversing the path.

2. The method of claim 1 wherein the tool movement is controlled by a motion controller having a minimum system time ($t_{min}$), being the time it requires to process a move, further comprising the step of upwardly adjusting minimum times (t*) which are shorter than the minimum system time ($t_{min}$) so as to be equal to the minimum system time ($t_{min}$).

3. The method as recited in claim 2 wherein the motion controller measures time in integer time steps, further comprising the steps of:
   (a) rounding real number minimum time (t*) for a move up to the controllers next large integer step; and
   (b) re-calculating the tool's move parameters of velocity (v) and acceleration (a) based upon the new integer move time (t*).

4. The method as recited in claim 3 wherein movement of the tool is measured, in Cartesian coordinates of X and Y, using one or more X movement sensors and a Y movement sensor, each sensor measuring movement in finite integer steps, and further comprising the steps of:
   (a) rounding a real number displacement of a move up to the next large integer step;
   (b) re-calculating tool velocity and accelerations based upon the move's new integer displacement.

5. The method as recited in claim 4 further comprising analyzing and modifying each of the path's discrete moves by:
   (a) combining adjacent substantially linearly-extending moves for forming a single linearly-extending move so long as the new linearly-extending move is within a specified maximum displacement of the path; and further
   (b) combining adjacent moves for forming a single move by insertion of a fillet move, so long as the new curved path of the fillet is within a specified maximum error of the path.

6. The method as recited in claim 5 further comprising:
   identifying a move ($move_i$), having a velocity profile of the velocity curve, which has a minimum time (t*) which is greater than two times the minimum system time ($t_{min}$), the move ($move_i$) having an initial velocity ($V_i$) and a final velocity ($V_f$); and
   sub-dividing the move ($move_i$) into at least first, second and third sub-moves ($move_{ia}$, $move_{ic}$, $move_{ic}$),
      (i) the first sub-move ($move_{ia}$) having the maximal acceleration ($a_{max}$) so as to achieve a maximum velocity ($V_{max}$),
      (ii) the second sub-move ($move_{ic}$) having the maximal velocity ($V_{max}$), and
      (iii) the third sub-move ($move_{ic}$) having a maximal deceleration ($a_{max}$)
   so that the minimum time (t*) is reduced while maintaining the initial and final velocities ($V_i, V_f$) for the move ($move_i$).

7. The method as recited in claim 6 further comprising the steps of:
   (a) rounding the real number displacement (L) of a sub-move ($move_{ia}$, $move_{ib}$, $move_{ic}$) up to the next larger integer step;
   (b) recalculating tool velocity and accelerations based upon the new sub-move displacement (L).

8. The method as recited in claim 1 further comprising:
   identifying a move ($move_i$), having a velocity profile of the velocity curve, which has a minimum time (t*) which is greater than two times the minimum system time ($t_{min}$), the move ($move_i$) having an initial velocity ($V_i$) and a final velocity ($V_f$); and
   sub-dividing the move ($move_i$) into at least first, second and third sub-moves ($move_{ia}$, $move_{ic}$, $move_{ic}$),
      (i) the first sub-move ($move_{ia}$) having the maximal acceleration ($a_{max}$) so as to achieve a maximum velocity ($V_{max}$),
      (ii) the second sub-move ($move_{ic}$) having the maximal velocity ($V_{max}$), and
      (iii) the third sub-move ($move_{ic}$) having a maximal deceleration ($a_{max}$)
   so that the minimum time (t*) is reduced while maintaining the initial and final velocities ($V_i, V_f$) for the move ($move_i$).

9. The method as recited in claim 8 further comprising the steps of:
   (a) rounding a real number displacement (L) of a sub-move ($move_{ia}$, $move_{ib}$, $move_{ic}$) up to the next larger integer step;
   (b) recalculating tool velocity (v) and accelerations (a) based upon the new sub-move displacement.

10. The method as recited in claim 1 wherein the initial minimum time (t*) for a discrete move is established by:
    (a) determining the time for traversing the move with a velocity profile which uses a constant maximum acceleration ($a_{max}$) from the start to the finish of the move; and
    if the velocity (v) at the finish of the move ($V_f$) is greater than the maximum velocity ($V_{max}$), then
      (b) determining the time for traversing the move with new velocity profile having a $3^{rd}$ order relationship which sets the final velocity to maximum ($V_{max}$), removing the constraint for using constant acceleration except for curved moves in which angular acceleration is a constant, and not exceeding maximum acceleration ($a_{max}$).

11. The method as recited in claim 8 wherein if the initial minimum time for a discrete move is less than the minimum system time ($t_{min}$), then set the initial minimum time to be equal to the minimum system time ($t_{min}$).

12. The method as recited in claim 1 wherein the minimum start velocity to maximum final velocity range is established by applying:
    (a) a linear velocity profile using maximum velocity ($V_{max}$) and a constant maximum acceleration ($a_{max}$), but is the resultant start velocity ($V_i$) is less than zero; then
    (b) a $3^{rd}$ order velocity profile using an initial velocity ($V_i$) and an initial acceleration (ai) of zero, and using variable acceleration, but
      if the resulting final acceleration ($a_f$) is greater than maximum acceleration ($a_{max}$); then
        (c) a $3^{rd}$ order velocity profile which constrains the final acceleration ($a_f$) to be maximum acceleration ($a_{max}$).

13. The method as recited in claim 1 wherein the maximum start velocity to minimum final velocity range is established by applying:
    (a) a linear velocity profile using maximum velocity ($V_{max}$) and a constant maximum acceleration ($a_{max}$), but
    if the resultant start velocity ($V_i$) is greater than maximum velocity ($V_{max}$); then
      (b) a $3^{rd}$ order velocity profile using an initial velocity ($v_i$) of maximum velocity ($V_{max}$), a start acceleration ($a_i$) and using variable acceleration (a), but
      if the resulting final acceleration ($a_f$) is greater than maximum acceleration ($a_{max}$); then
        (c) a $3^{rd}$ order velocity profile which constrains the final acceleration ($a_f$) to be maximum acceleration ($a_{max}$).

* * * * *

UNITED STATES PATENT AND TRADEMARK OFFICE
CERTIFICATE OF CORRECTION

PATENT NO. : 6,294,755 B1
DATED : September 25, 2001
INVENTOR(S) : Sawatzky et al.

It is certified that error appears in the above-identified patent and that said Letters Patent is hereby corrected as shown below:

Column 25,
Line 9, delete "large" and insert -- larger time --.
Line 32, before "identifying" insert -- (a) --;
Line 38, before "sub-dividing" insert -- (b) --.
Line 58, before "identifying" insert -- (a) --;
Line 63, before "sub-dividing" insert -- (b) --.

Column 26,
Line 17, delete "(t*)" and insert -- $(t^*_i)$ --.
Line 41, delete "is" (first occurrence) and insert -- if --.
Line 58, delete "an initial" and insert -- a start --;
Line 62, after "maximum" insert -- negative --;
Line 64, after "maximum" insert -- negative --.

Signed and Sealed this

Twenty-second Day of October, 2002

Attest:

Attesting Officer

JAMES E. ROGAN
Director of the United States Patent and Trademark Office